(12) United States Patent
Ramaiah et al.

(10) Patent No.: US 12,210,659 B2
(45) Date of Patent: Jan. 28, 2025

(54) REAL-TIME MANAGEMENT OF DELTA INVENTORY CERTIFICATES FOR COMPONENT VALIDATION USING EVENTING AND CLOUD INFRASTRUCTURES

(71) Applicant: Dell Products, L.P., Round Rock, TX (US)

(72) Inventors: Mahesh Babu Ramaiah, Bangalore (IN); Kalyani Korubilli, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 511 days.

(21) Appl. No.: 17/656,472

(22) Filed: Mar. 25, 2022

(65) Prior Publication Data

US 2023/0306141 A1 Sep. 28, 2023

(51) Int. Cl.
*G06F 21/73* (2013.01)
*G06F 9/4401* (2018.01)
*G06F 13/40* (2006.01)

(52) U.S. Cl.
CPC ............ *G06F 21/73* (2013.01); *G06F 9/4416* (2013.01); *G06F 13/4081* (2013.01)

(58) Field of Classification Search
CPC ......... G06F 21/72–73; G06F 21/78–79; G06F 9/4416; G06F 13/4081; H04L 9/0822; H04L 9/0894

USPC ............................................................ 726/26
See application file for complete search history.

(56) References Cited

U.S. PATENT DOCUMENTS

| | | | | |
|---|---|---|---|---|
| 10,033,721 | B2 * | 7/2018 | Robison | H04L 63/0823 |
| 10,530,658 | B2 * | 1/2020 | Dasar | H04L 41/0893 |
| 10,922,385 | B2 * | 2/2021 | Young | G06F 21/604 |
| 2015/0244708 | A1 * | 8/2015 | Ballard | H04L 63/0823 726/6 |
| 2017/0366536 | A1 * | 12/2017 | Robison | H04L 9/3226 |
| 2018/0331913 | A1 * | 11/2018 | Dasar | H04L 41/12 |
| 2019/0042707 | A1 * | 2/2019 | Young | G06F 21/604 |
| 2022/0300582 | A1 * | 9/2022 | Iyer | G06F 21/53 |
| 2022/0309170 | A1 * | 9/2022 | Iyer | G06F 21/604 |
| 2022/0335131 | A1 * | 10/2022 | Vidyadhara | H04L 41/28 |

* cited by examiner

*Primary Examiner* — Samson B Lemma
(74) *Attorney, Agent, or Firm* — Fogarty LLP

(57) ABSTRACT

Systems and methods for real-time management of delta inventory certificates for component validation using eventing and cloud infrastructures are described. In an embodiment, an Information Handling System (IHS) may include: a processor, a Remote Access Controller (RAC) coupled to the processor, and a memory coupled to the RAC. The memory may have program instructions stored thereon that, upon execution by the RAC, cause the RAC to: determine that a component has been added to the IHS; in response to the addition, request that a delta inventory certificate be generated by a remote validation service; and receive a copy of the delta inventory certificate.

18 Claims, 13 Drawing Sheets

US 12,210,659 B2

REAL-TIME MANAGEMENT OF DELTA INVENTORY CERTIFICATES FOR COMPONENT VALIDATION USING EVENTING AND CLOUD INFRASTRUCTURES

FIELD

The present disclosure relates generally to Information Handling Systems (IHSs) and relates more particularly to systems and methods for real-time management of delta inventory certificates for component validation using eventing and cloud infrastructures.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some types of IHSs, such as mobile phones and tablets, are typically manufactured in large quantities and with few variations. For instance, for a particular model of mobile phone or tablet, hundreds of thousands of identical, or nearly identical, devices may be produced. Other types of IHSs, such as rack-mounted servers, are frequently manufactured in smaller quantities and customized according to specifications provided by a customer that has contracted for the assembly and delivery of the server.

In those instances, a customer may specify various hardware and/or software customizations that configure the server to support specific functionality. For example, a customer may contract for manufacture and delivery of a server that includes security adaptations that enable the server to securely process high volumes of financial transactions.

Over time, a customer may acquire many IHSs that have been factory customized in various manners. In addition, each IHS may be modified throughout its service history as software and hardware of the IHS is repaired and replaced.

SUMMARY

Systems and methods for real-time management of delta inventory certificates for component validation using eventing and cloud infrastructures are described. In an illustrative, non-limiting embodiment, an Information Handling System (IHS) may include: a processor, a Remote Access Controller (RAC) coupled to the processor, and a memory coupled to the RAC. The memory may have program instructions stored thereon that, upon execution by the RAC, cause the RAC to: determine that a component has been added to the IHS; in response to the addition, request that a delta inventory certificate be generated by a remote validation service; and receive a copy of the delta inventory certificate.

For example, the component may include a hot-pluggable or hot-swappable device. To determine that the component has been added to the IHS, the program instructions, upon execution by the RAC, may cause the RAC to receive an indication from a Basic Input/Output System (BIOS) of the IHS that the component has been coupled to the IHS. Additionally, or alternatively, the RAC may receive an indication from an Operating System (OS) of the IHS that the component has been coupled to the IHS.

The delta inventory certificate may indicate addition of the component relative to a factory inventory certificate. Alternatively, the delta inventory certificate may indicate addition of the component relative to a previous delta inventory certificate.

The program instructions, upon execution by the RAC, may cause the RAC to determine that the component has been removed from the IHS and create another delta inventory certificate that indicates removal of the component relative to the delta inventory certificate. The program instructions, upon execution by the RAC, also cause the RAC to transmit a copy of the other delta inventory certificate to the remote validation service. Moreover, to transmit the copy of the other delta inventory certificate to the remote validation service, the program instructions, upon execution by the RAC, may cause the RAC to encrypt the copy of the delta inventory certificate.

The remote validation service may be configured to maintain a ledger associating each of a plurality of IHSs with a corresponding set of delta inventory certificates. The remote validation service may also be configured to store an indication of the other delta certificate associated with an identity of the IHS in the ledger. Furthermore, the remote validation service may be configured to generate the delta inventory certificate, at least in part, in response to a determination by the remote validation service, using the ledger, that the component is not coupled to another one of the plurality of IHS.

In another illustrative, non-limiting embodiment, a hardware memory device may have program instructions stored thereon that, upon execution by a RAC of an IHS, cause the RAC to: determine that a component has been removed from the IHS and create a delta inventory certificate that indicates removal of the component relative to a factory inventory certificate or a previous delta inventory certificate. The component may include a hot-pluggable or hot-swappable device.

To determine that the component has been removed from the IHS, the program instructions, upon execution by the RAC, may cause the RAC to receive an indication from a BIOS or OS of the IHS that the component has been decoupled from the IHS. The program instructions, upon execution by the RAC, may further cause the RAC to transmit a copy of the delta inventory certificate to the remote validation service.

In yet another illustrative, non-limiting embodiment, a method may include, in response to a component being added to an IHS, receiving a request for a delta inventory certificate from a RAC coupled to the IHS; and transmitting a copy of the delta inventory certificate to the RAC. The method may also include comprising maintaining a ledger associating each of a plurality of IHSs with a corresponding set of delta inventory certificates.

The method may include storing an indication of the delta certificate associated with an identity of the IHS in the ledger. The method may further include generating the delta inventory certificate, at least in part, in response to a determination, using the ledger, that the component is not coupled to another one of the plurality of IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
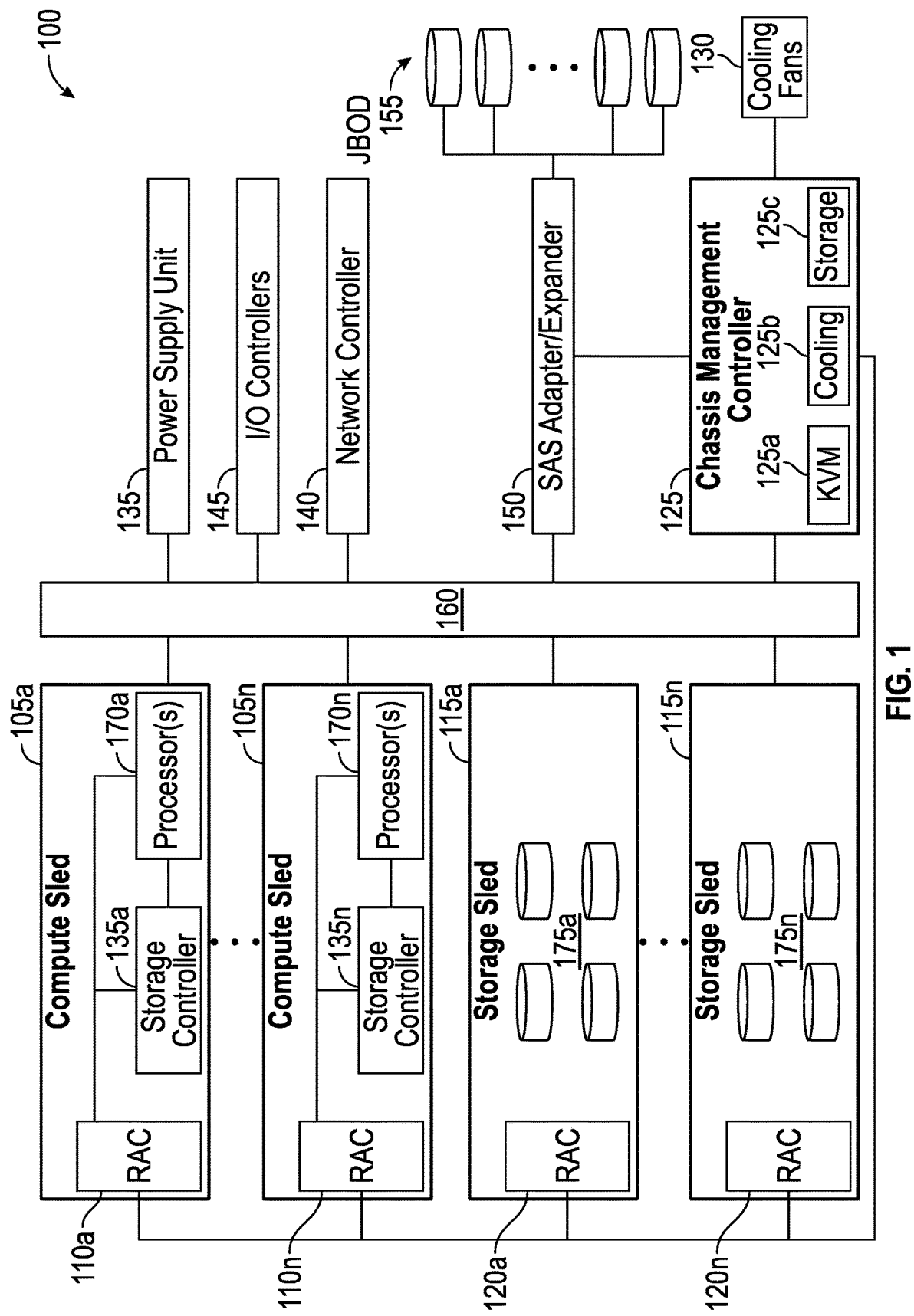
FIG. 1 is a diagram illustrating certain components of a chassis, according to some embodiments, for tracking hardware components of the chassis.

FIG. 1 is a block diagram illustrating certain components of a chassis 100 comprising one or more compute sleds 105a-n and one or more storage sleds 115a-n that may be configured to implement systems and methods for real-time management of delta inventory certificates for validating or verifying components of chassis 100 using eventing and cloud infrastructures. Embodiments of chassis 100 may include a wide variety of different hardware configurations. Such variations in hardware configuration may result from chassis 100 being factory assembled to include components specified by a customer that has contracted for manufacture and delivery of chassis 100.

Upon delivery and deployment of an Information Handling System (IHS), an IHS may be modified by replacing various hardware components of the IHS or by installing new hardware components to the IHS. As described in additional detail below, chassis 100 may include capabilities that allow a customer to verify that modifications to the hardware components of chassis 100 are secure and, in particular, to validate or verify that hardware installed by a customer in chassis 100 is the same hardware that was supplied to the customer.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from chassis 100, thus allowing the computing and storage capabilities of a chassis to be reconfigured by swapping the sleds with different types of sleds without affecting the operations of the other sleds installed in the chassis 100.

Multiple chassis 100 may be housed within a rack. Data centers may utilize large numbers of racks, with different types of chassis installed in the various configurations of racks. The modular architecture provided by the sleds, chassis, and rack allow for certain resources, such as cooling, power and network bandwidth, to be shared by compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within chassis 100 that is housed within the rack. Chassis 100 may alternatively or additionally include one or more cooling fans 130 that may be similarly operated to ventilate heated air from within sleds 105a-n, 115a-n installed within the chassis. Rack and chassis 100 installed within the rack may utilize various configurations and combinations of cooling fans to cool sleds 105a-n, 115a-n and other components housed within chassis 100.

Sleds 105a-n, 115a-n may be individually coupled to chassis 100 via connectors that correspond to the bays provided by chassis 100 and that physically and electrically couple an individual sled to backplane 160. Chassis backplane 160 may be a printed circuit board that includes electrical traces and connectors that are configured to route signals between the various components of chassis 100 that are connected to backplane 160.

Backplane 160 may include various additional components, such as cables, wires, midplanes, backplanes, connectors, expansion slots, and multiplexers. In certain implementations, backplane 160 may be a motherboard that includes various electronic components installed thereon. Such components installed on backplane 160 may include components that implement all or part of the operations described with regard to the Serial Attached SCSI (SAS) expander 150, I/O controllers 145, network controller 140 and power supply unit (PSU) 135.

Backplane 160 may be uniquely identified based on a code or other identifier that may be permanently encoded in a non-volatile memory of backplane 160 by its manufacturer. In various embodiments, systems and methods described herein may support validation or verification of backplane 160 as being the same backplane that was installed at the factory during the manufacture of chassis 100. In scenarios where backplane 160 is replaced, these systems and methods may support validation or verification that a replacement backplane installed by a customer in chassis 100 is the same backplane that was supplied to the customer.

Figure 2:
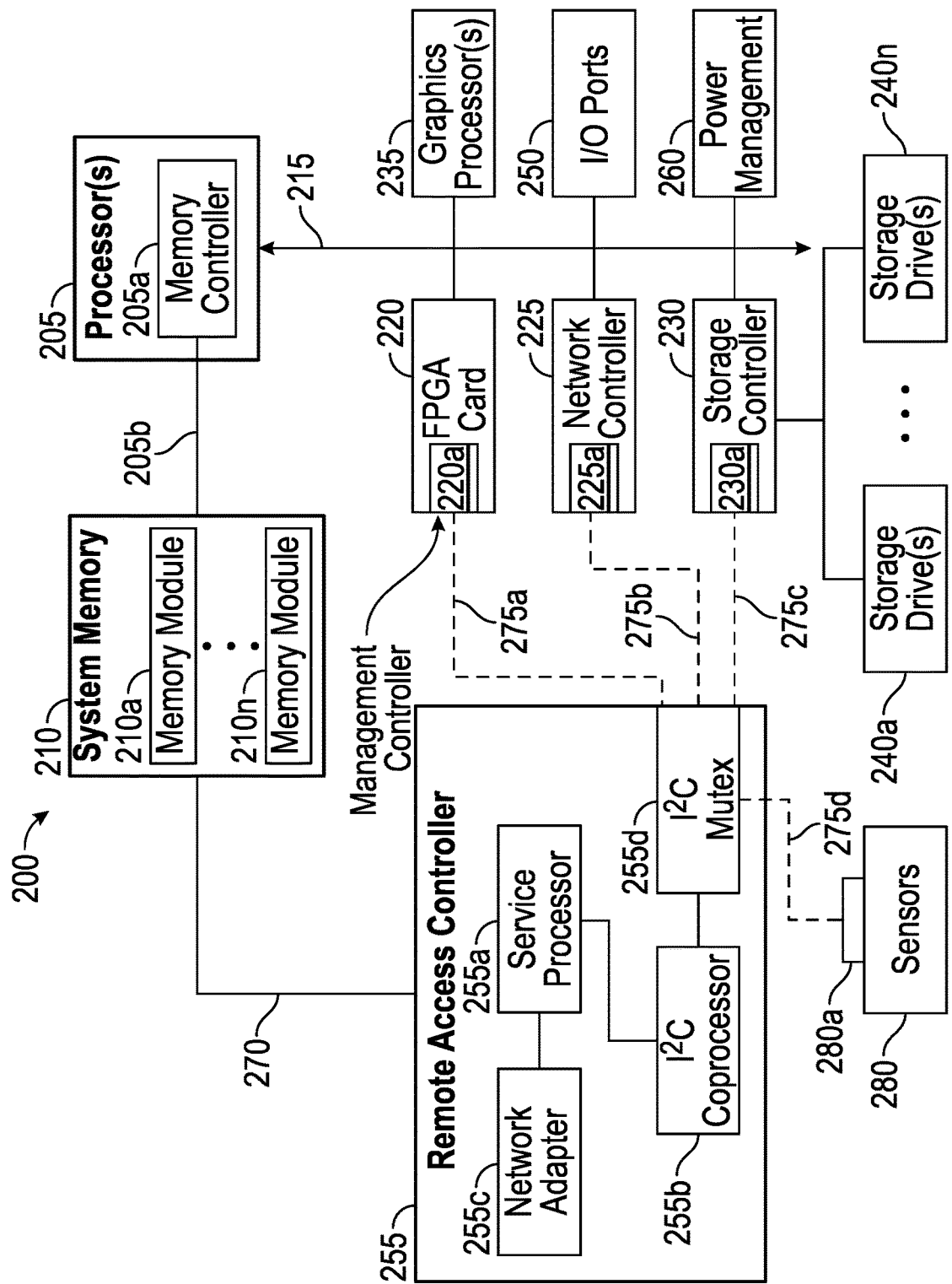
FIG. 2 is a diagram illustrating certain components of an IHS configured, according to some embodiments, for tracking hardware components of the IHS.

Each of compute sleds 105*a-n* may be an IHS such as described with regard to IHS 200 of FIG. 2. Each of compute sleds 105*a-n* may provide computational processing resources that may be used to support a variety of e-commerce, multimedia, business and scientific computing applications, such as services provided via a cloud implementation. Compute sleds 105*a-n* are typically configured with hardware and software that provide leading-edge computational capabilities. Accordingly, services provided using such computing capabilities are typically provided as high-availability systems that operate with minimum downtime. Compute sleds 105*a-n* may be configured for general-purpose computing or may be optimized for specific computing tasks.

As illustrated, each of compute sleds 105*a-n* includes a respective Remote Access Controller (RAC) 110*a-n*. Each of RACs 110*a-n* provides capabilities for remote monitoring and management of a corresponding one of compute sleds 105*a-n*. In support of these monitoring and management operations, RACs 110*a-n* may utilize both in-band and sideband (i.e., out-of-band) communications with various components of compute sleds 105*a-n* and chassis 100. RACs 110*a-n* may collect various types of sensor data, such as collecting temperature sensor readings that are used in support of airflow cooling of the chassis 100 and the sleds 105*a-n*, 115*a-n*. In addition, each of RACs 110*a-n* may implement various functions related to compute sleds 105*a-n* that utilize sideband bus connections with various internal components thereof.

Each compute sled 105*a-n* installed in chassis 100 may be uniquely identified based on a code or other identifier that may be permanently encoded in a non-volatile memory of a respective compute sled 105*a-n* by its manufacturer. In various embodiments, systems and methods described herein support validation or verification of each compute sled 105*a-n* as being a compute sled that was installed at the factory during the manufacture of chassis 100.

During a provisioning phase of the factory assembly of chassis 100, a signed certificate that specifies hardware components of chassis 100 that were installed during its manufacture may be stored in a non-volatile memory accessed by each RAC 110*a-n* of each compute sled 105*a-n*.

An example of a certificate may include an X.509 certificate, which is a digital certificate that uses the X.509 public key infrastructure (PKI) standard to verify that a public key belongs to the user, computer, component, or service identity identified within the certificate. In some implementations, such a certificate may include a version (which X.509 version applies to the certificate), a serial number (the issuer or entity creating the certificate assigns it a serial number that distinguishes it from other certificates), algorithm information (the algorithm used by the issuer to sign the certificate), the name of the entity issuing the certificate (e.g., a certificate authority), a validity period of the certificate (start/end date and time), the name of the entity the certificate is issued to, public key information, and various extensions.

Using a signed inventory certificate, a customer may validate or verify that the hardware components of chassis 100 are the same components that were installed at the factory during its manufacture. In scenarios where hardware components of a chassis are replaced or new hardware components are added to the chassis, systems and methods described herein may support validation or verification that components installed by a customer in chassis 100 are the same components that were supplied to the customer.

Each of the compute sleds 105*a-n* may include respective one of storage controllers 135*a-n* that may be utilized to access storage drives that are accessible via chassis 100. Some individual storage controllers 135*a-n* may provide support for Redundant Array of Independent Disks (RAID) configurations of logical and physical storage drives, such as storage drives provided by storage sleds 115*a-n*. Some or all individual storage controllers 135*a-n* may be Host Bus Adapters (HBAs) that provide more limited capabilities in accessing physical storage drives provided via storage sleds 115*a-n* and/or via SAS expander 150.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via SAS expander 150 coupled to the backplane 160.

SAS expander 150 may support connections to a number of Just a Bunch Of Disks (JBOD) storage drives 155 that may be configured and managed individually and without implementing data redundancy across drives 155. Additional storage resources 155 may also be at various other locations within a datacenter in which chassis 100 is installed. Such additional storage resources 155 may also be remotely located.

SAS expander 150 and storage drive 155 may be uniquely identified based on a code or other identifier that may be permanently encoded in a non-volatile memory of SAS expander 150 or storage drive 155 by its respective manufacturer. In instances where SAS expander 150 and storage drives 155 are factory installed, systems and methods described herein support validation or verification of SAS expander 150 and storage drives 155 as being the same SAS expander and storage drives that were installed at the factory during the manufacture of chassis 100. In scenarios where SAS expander 150 or storage drive 155 are replaced or a new SAS expander or storage drive is added to the chassis, these systems and methods may support validation or verification that a SAS expander and storage drives installed by a customer in chassis 100 are the same components that were supplied to the customer.

As illustrated, chassis 100 also includes one or more storage sleds 115*a-n* that are coupled to the backplane 160 and installed within one or more bays of chassis 200 in a similar manner to compute sleds 105*a-n*. Each of individual storage sleds 115*a-n* may include different numbers and types of storage devices. For instance, storage sleds 115*a-n* may include SAS magnetic disk drives, Serial Advanced Technology Attachment (SATA) magnetic disk drives, solid-state drives (SSDs), and other types of storage drives in various combinations.

Storage sleds 115*a-n* may be utilized in various storage configurations by compute sleds 105*a-n* that are coupled to chassis 100. As illustrated, each storage sled 115*a-n* includes RAC 120*a-n* to provide capabilities for remote monitoring and management.

Each of storage sleds 115*a-n* may be uniquely identified based on a code or other identifier that may be permanently encoded in a non-volatile memory of the respective storage sled 115*a-n* by its manufacturer. In various embodiments, systems and methods described herein support validation or verification of each storage sled 115*a-n* as being a storage sled installed at the factory during the manufacture of chassis 100. In scenarios where one of storage sleds 115*a-n* is replaced or a new storage sled is being added to the chassis, these systems and methods may support validation or verification that a storage sled installed by a customer in chassis 100 is the same storage sled that was supplied to the customer.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed.

Network controller 140 may be uniquely identified based on a code or other identifier that may be permanently encoded in a non-volatile memory of network controller 140 by its manufacturer. In various embodiments, systems and methods described herein may support validation or verification of network controller 140 as being the same network controller that was installed at the factory during the manufacture of chassis 100. In scenarios where network controller 140 is replaced, these systems and methods may support validation or verification that a replacement network controller installed by a customer in chassis 100 is the same network controller that was supplied to the customer.

Chassis 100 may similarly include PSU 135 that provides the components of the chassis with various levels of DC power from an AC power source or from power delivered via a power system provided by a rack within which chassis 100 may be installed. In certain embodiments, PSU 135 may be implemented within a sled that may provide chassis 100 with redundant, hot-swappable PSUs.

PSU 135 may be uniquely identified based on a code or other identifier that may be permanently encoded in a non-volatile memory of PSU 135 by its manufacturer. In various embodiments, systems and methods described herein may support validation or verification of PSU 135 as being the same PSU that was installed at the factory during the manufacture of chassis 100. In scenarios where PSU 135 is replaced or a new PSU is added to the chassis, these systems and methods may support validation or verification that a PSU installed by a customer in chassis 100 is the same PSU that was supplied to the customer.

Chassis 100 may also include various I/O controllers 140 that may support various I/O ports, such as USB ports that may be used to support keyboard and mouse inputs and/or video display capabilities. Such I/O controllers 145 may be utilized by chassis management controller (CMC) 125 to support various KVM (Keyboard, Video and Mouse) 125*a* capabilities that provide administrators with the ability to interface with the chassis 100.

Each I/O controller 140 may be uniquely identified based on a code or other identifier that may be permanently encoded in a non-volatile memory of the respective I/O controller 140 by its manufacturer. In various embodiments, systems and methods described herein may support validation or verification of I/O controllers 140 as being the same I/O controllers that were installed at the factory during the manufacture of chassis 100. In scenarios where I/O controller 140 is replaced or a new I/O controller is added to a chassis, these systems and methods may support validation or verification that an I/O controller installed by a customer in chassis 100 is the same I/O controller that was supplied to the customer.

CMC 125 may also include storage module 125*c* that provides capabilities for managing and configuring certain aspects of the storage devices of chassis 100, such as the storage devices provided within storage sleds 115*a-n* and within JBOD 155.

CMC 125 may be uniquely identified based on a code or other identifier that may be permanently encoded in a non-volatile memory of CMC 125 by its manufacturer. In various embodiments, systems and methods described herein may support validation or verification of CMC 125 as being the same CMC that was installed at the factory during the manufacture of chassis 100. In scenarios where CMC 125 is replaced or a new CMC is added, these systems and methods may support validation or verification that a CMC installed by a customer in chassis 100 is the same CMC that was supplied to the customer.

In addition to providing support for KVM 125*a* capabilities for administering chassis 100, CMC 125 may support various additional functions for sharing the infrastructure resources of chassis 100. In some scenarios, CMC 125 may implement tools for managing power 135, network bandwidth 140, and airflow cooling 130 available via chassis 100. Airflow cooling 130 may be provided by a rack in which chassis 100 may be installed and managed by cooling module 125*b* of CMC 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting the validation or verification of secure modifications to the components of IHS 200. It should be appreciated that although the embodiments described herein may describe an IHS that is a compute sled or similar computing component that may be deployed within the bays of a chassis, other embodiments may be utilized with other types of IHSs that may also support validation or verification of the secure assembly and delivery of the IHS 200. In the example of FIG. 2, IHS 200 may be a computing component, such as compute sled 105*a-n* or other type of server, such as an 1 RU server installed within a 2 RU chassis, that is configured to share infrastructure resources provided by chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200.

Moreover, IHS 200 may include capabilities that allow a customer to validate that the hardware components of IHS 200 are the same hardware components that were installed at the factory during its manufacture. In scenarios where hardware components of IHS 200 are replaced or new hardware components are added to IHS 200, systems and methods described herein may support validation or verification that hardware components installed by a customer in IHS 200 are the same components that were supplied to the customer.

IHS 200 may utilize one or more processors 205. In some embodiments, processors 205 may include a main processor and a co-processor, each of which may include a plurality of processing cores that, in certain cases, may each be used to run an instance of a server process. In some implementations, one or all of processor(s) 205 may be graphics processing units (GPUs) in scenarios where IHS 200 has been configured to support operations such as multimedia services and graphics applications.

Each of processors 205 may be uniquely identified based on a code or other identifier that may be permanently encoded in a respective processor 205 by its manufacturer. In various embodiments, systems and methods described herein may support validation or verification of processors 205 as being the same processors that were installed at the factory during the manufacture of IHS 200. In some instances, the motherboard on which processor 205 is mounted may be replaced. In such scenarios, these systems and methods may support validation or verification that a replacement motherboard installed by a customer in IHS 200 is the same motherboard that was supplied to the customer.

As illustrated, processor(s) 205 includes integrated memory controller 205a that may be implemented directly within the circuitry of processor 205. Alternatively, memory controller 205a may be a separate integrated circuit that is located on the same die as processor 205. Memory controller 205a may be configured to manage the transfer of data to and from system memory 210 of processor(s) 205 via high-speed memory interface 205b. System memory 210 is coupled to processor(s) 205 via memory bus 205b that provides processor(s) 205 with high-speed memory used in the execution of computer program instructions by processor(s) 205. Accordingly, system memory 210 may include memory components, such as static RAM (SRAM), dynamic RAM (DRAM), NAND Flash memory, suitable for supporting high-speed memory operations by processor(s) 205. In certain embodiments, system memory 210 may combine both persistent, non-volatile memory and volatile memory.

In certain embodiments, system memory 210 may include multiple removable memory modules. System memory 210 of the illustrated embodiment includes removable memory modules 210a-n. Each of removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

Each of the memory modules 210a-n may be uniquely identified based on a code or other identifier that may be permanently encoded in a respective memory module 210a-n by its manufacturer. In various embodiments, systems and methods described herein may support validation or verification of memory modules 210a-n as being the same memory modules that were installed at the factory during the manufacture of IHS 200. In scenarios where one or more memory modules 210a-n of IHS 200 are replaced or new memory modules are being added to IHS 200, these systems and methods may support validation or verification that memory modules installed by a customer in IHS 200 are the same memory modules that were supplied to the customer.

IHS 200 may utilize a chipset that may be implemented by integrated circuits that are connected to each processor 205. All or portions of the chipset may be implemented directly within the integrated circuitry of processor(s) 205. The chipset may provide processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each FPGA card 220 may include various processing and memory resources, in addition to an FPGA logic unit that may include circuits that can be reconfigured after deployment of IHS 200 through programming operations supported by FPGA card 220. Through such reprogramming of such logic units, each individual FPGA card 220 may be optimized to perform specific processing tasks, such as specific signal processing, security, data mining, and artificial intelligence functions, and/or to support specific hardware coupled to IHS 200. In some implementations, a single FPGA card 220 may include multiple FPGA logic units, each of which may be separately programmed to implement different computing operations, such as in computing different operations that are being offloaded from processor(s) 205. FPGA card 220 may also include a management controller 220a that may support interoperation with RAC 255 via a sideband device management bus 275a.

Each of FPGA cards 220 installed in IHS 200 may be uniquely identified based on a code or other identifier that may be permanently encoded in FPGA card 220 by its manufacturer. In various embodiments, systems and methods described herein may support validation or verification of FPGA card 220 as being the same FPGA card that was installed at the factory during the manufacture of IHS 200. In scenarios where FPGA card 220 of IHS 200 is replaced or a new FPGA card is added to IHS 200, these systems and methods may support validation that an FPGA card installed by a customer in IHS 200 is the same FPGA card that was supplied to the customer.

Processor(s) 205 may also be coupled to network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. Alternatively, network controller 225 may be an integrated component of IHS 200.

Network controller 225 may be uniquely identified based on a code or other identifier, such as a MAC address, that may be permanently encoded in a non-volatile memory of network controller 225 by its manufacturer. In various embodiments, systems and methods described herein may support validation or verification of network controller 225 as being the same network controller that was installed at the factory during the manufacture of IHS 200. In scenarios where a network controller 225 of IHS 200 is replaced or a new network controller is added to IHS 200, these systems and methods may support validation that a network controller installed by a customer in IHS 200 is the same network controller that was supplied to the customer.

A variety of additional components may be coupled to processor(s) 205 via in-band bus 215. For instance, processor(s) 205 may also be coupled to power management unit 260 that may interface with power system unit 135 of chassis 100 in which an IHS, such as a compute sled, may be installed. In certain implementations, graphics processor 235 may be comprised within one or more video or graphics cards, or an embedded controller, installed as components of the IHS 200. For example, graphics processor 235 may be an integrated component of RAC 255 and may be utilized to support the display of diagnostic and administrative interfaces related to IHS 200 via display devices that are coupled, either directly or remotely, to RAC 255.

Components such as power management unit 260 and graphics processor 235 may also be uniquely identified based on a code or other identifier that may be permanently encoded in a non-volatile memory of these components by their respective manufacturer. In various embodiments, systems and methods described herein may support validation or verification of these components as being components that were installed at the factory during the manufacture of IHS 200. In scenarios where these components of IHS 200 are replaced or new components are installed in IHS 200, these systems and methods may support validation or verification that components installed by a customer in IHS 200 are the same components that were supplied to the customer.

In certain embodiments, IHS 200 may operate using a BIOS (Basic Input/Output System) that may be stored in a non-volatile memory accessible by the processor(s) 205. The BIOS may provide an abstraction layer by which the operating system (OS) of IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by IHS 200. The BIOS instructions may also load an OS for use by the IHS 200.

In certain embodiments, IHS 200 may utilize Unified Extensible Firmware Interface (UEFI) in addition to or instead of a BIOS. In certain embodiments, the operations provided by a BIOS may be implemented, in full or in part, by RAC 255. Moreover, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As previously described, IHS 200 may include a RAC 255 that supports remote management of IHS 200 and of various internal components of IHS 200. In certain embodiments, RAC 255 may operate from a different power plane from the processors 205 and other components of IHS 200, thus allowing RAC 255 to operate, and management tasks to proceed, while the processing cores of IHS 200 are powered off.

In some cases, various operations provided by the BIOS, including launching the OS of the IHS 200, may be implemented by RAC 255. RAC 255 may perform various functions to verify the integrity of the IHS 200 and its hardware components prior to initialization of the OS of IHS 200 (i.e., in a bare-metal state). In some embodiments, certain operations of RAC 255, such as the described inventory certificate generation and validation operations, may operate using validated instructions, and thus within the root of trust of IHS 200.

RAC 255 may be uniquely identified based on a code or other identifier that may be permanently encoded in a non-volatile memory of RAC 255 by its manufacturer. In various embodiments, systems and methods described herein may support validation or verification of RAC 255 as being the same controller that was installed at the factory during the manufacture of IHS 200. In scenarios where RAC 255 of IHS 200 is replaced, these systems and methods may support validation or verification that a replacement RAC installed by a customer in IHS 200 is the same RAC that was supplied to the customer.

During a provisioning phase of the factory assembly of IHS 200, a signed certificate that specifies factory installed hardware components of IHS 200 that were installed during manufacture of IHS 200 may be stored in a non-volatile memory that is accessed by RAC 255. Using this signed inventory certificate stored by RAC 255, a customer may validate or verify that the detected hardware components of IHS 200 are the same hardware components that were installed at the factory during manufacture of IHS 200.

As described below, in response to replacement of one or more hardware components of IHS 200 or to the addition of new hardware components to IHS 200, RAC 255 may be configured to receive a new signed inventory certificate or an updated signed inventory certificate that may be used to validate or verify that the hardware components installed by a customer are the same hardware components that were supplied to the customer.

In support of the capabilities for validating the detected hardware components of IHS 200 against the inventory information that is specified in a signed inventory certificate, RAC 255 may support various cryptographic capabilities. For instance, RAC 255 may include capabilities for key generation such that RAC 255 may generate keypairs that include a public key and a corresponding private key. As described in additional detail below, using generated keypairs, RAC 255 may digitally sign inventory information collected during the factory assembly of IHS 200 such that the integrity of this signed inventory information may be validated later using the public key by a customer that has purchased IHS 200. Using these cryptographic capabilities of RAC 255, the factory installed inventory information that is included in an inventory certificate may be anchored to a specific RAC 255, since the keypair used to sign the inventory information is signed using the private key that is generated and maintained by RAC 255.

In some embodiments, the cryptographic capabilities of RAC 255 may also include safeguards for encrypting any private keys that are generated by RAC 255 and further anchoring them to components within the root of trust of IHS 200. For instance, a RAC 255 may include capabilities for accessing hardware root key (HRK) capabilities of IHS 200, such as for encrypting the private key of the keypair generated by RAC 255.

The HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200.

If a root of trust cannot be established through validation of RAC 255's cryptographic functions that are used to access the hardware root key, the private key used to sign inventory information cannot be retrieved. In some cases, the private key encrypted by RAC 255 using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as RAC 255.

RAC 255 may include a service processor 255a, or specialized microcontroller, that operates management software that supports remote monitoring and administration of IHS 200. RAC 255 may be installed on the motherboard of IHS 200 or may be coupled to IHS 200 via an expansion slot provided by the motherboard. In support of remote monitoring, network adapter 225c may support connections with RAC 255 using wired and/or wireless network connections via a variety of network technologies. As a non-limiting example of a RAC, the integrated Dell RAC (iDRAC) from Dell® is embedded within Dell PowerEdge™ servers and provides functionality that helps information technology (IT) administrators deploy, update, monitor, and maintain servers remotely.

In some implementations, RAC 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of RAC 255. Certain of the managed devices of IHS 200, such as non-standard hardware 220, network controller 225, and storage controller 230, are coupled to the IHS processor(s) 205 via an in-line bus 215, such as a PCIe root complex, that is separate from the I2C sideband bus connections 275a-d used for device management.

The management operations of RAC 255 may utilize information collected by various managed sensors 280 located within the IHS. For instance, temperature data collected by sensors 280 may be utilized by RAC 255 in support of closed-loop airflow cooling of the IHS 200.

Service processor 255a of RAC 255 may rely on an I2C co-processor 255b to implement sideband I2C communications between RAC 255 and managed components 220, 225, 230, 280 of the IHS. I2C co-processor 255b may be a specialized co-processor or micro-controller that is configured to interface via a sideband I2C bus interface with the managed hardware components 220, 225, 230, 280 of IHS 200. In some embodiments, I2C co-processor 255b may be an integrated component of the service processor 255a, such as a peripheral system-on-chip (SoC) feature that may be provided by service processor 255a.

Each I2C bus 275a-d is illustrated as single line in FIG. 2. However, each I2C bus 275a-d may be comprised of a clock line and data line that couple RAC 255 to I2C endpoints 220a, 225a, 230a, 280a, which may be referred to as modular field replaceable units (FRUs).

I2C co-processor 255b may interface with individual managed devices 220, 225, 230, 280 via individual sideband I2C buses 275a-d selected through the operation of I2C multiplexer 255d. Via switching operations by I2C multiplexer 255d, sideband bus connection 275a-d may be established by a direct coupling between the I2C co-processor 255b and individual managed devices 220, 225, 230, or 280. In providing sideband management capabilities, I2C co-processor 255b may each interoperate with corresponding endpoint I2C controllers 220a, 225a, 230a, 280a that implement the I2C communications of the respective managed devices 220, 225, 230. Endpoint I2C controllers 220a, 225a, 230a, 280a may be implemented as dedicated microcontrollers for communicating sideband I2C messages with RAC 255, or endpoint I2C controllers 220a, 225a, 230a, 280a may be integrated SoC functions of a processor of the respective managed device endpoints 220, 225, 230, 280.

In various embodiments, IHS 200 does not include each of the components shown in FIG. 2. In various embodiments, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the operations performed by the illustrated components may instead be provided by components integrated into the one or more processor(s) 205 as an SoC.

Figure 3:
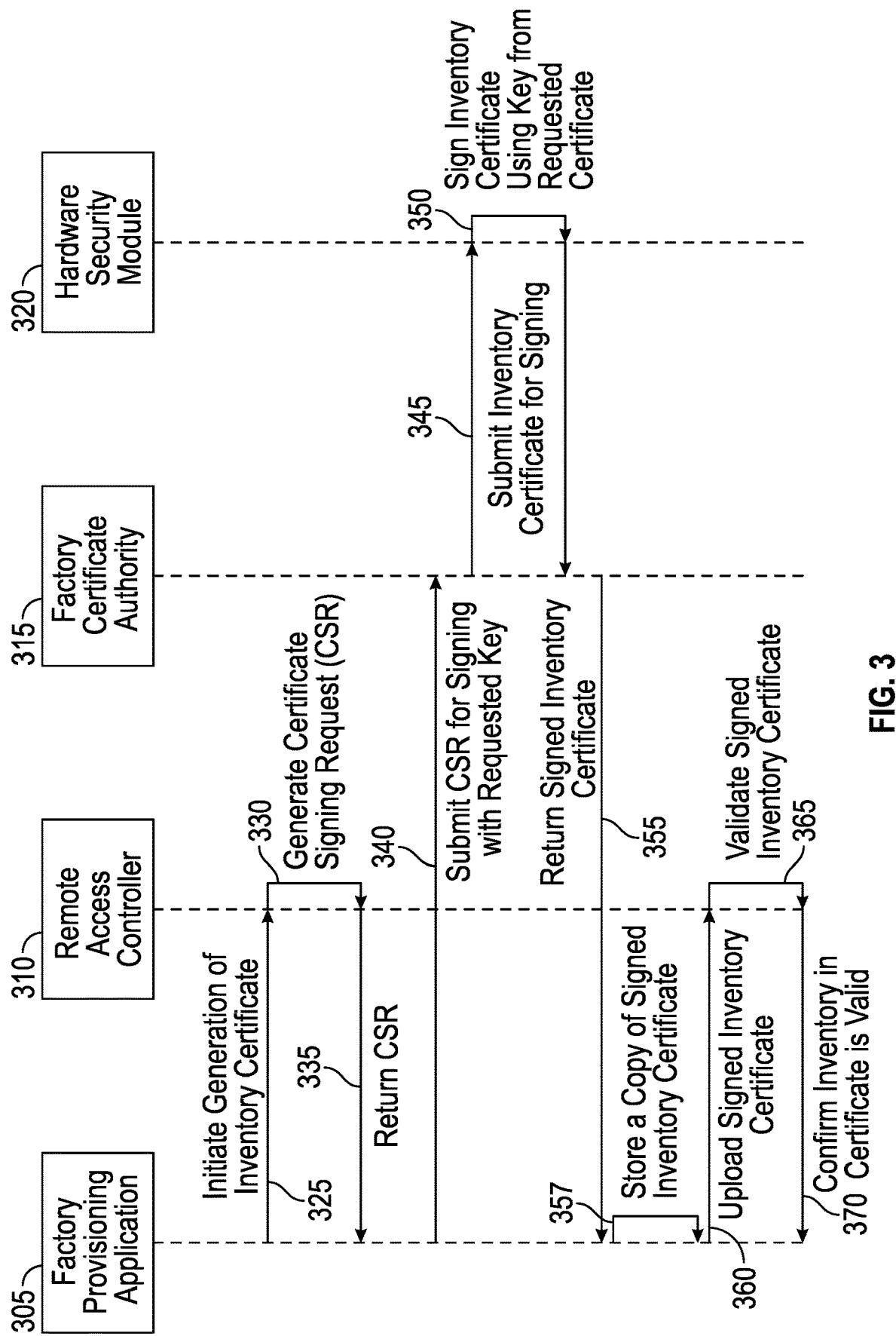
FIG. 3 is a swim lane diagram illustrating certain responsibilities of components of a system configured according to certain embodiments for factory provisioning of an IHS in a manner that supports tracking of hardware components of the IHS.
Figure 4:
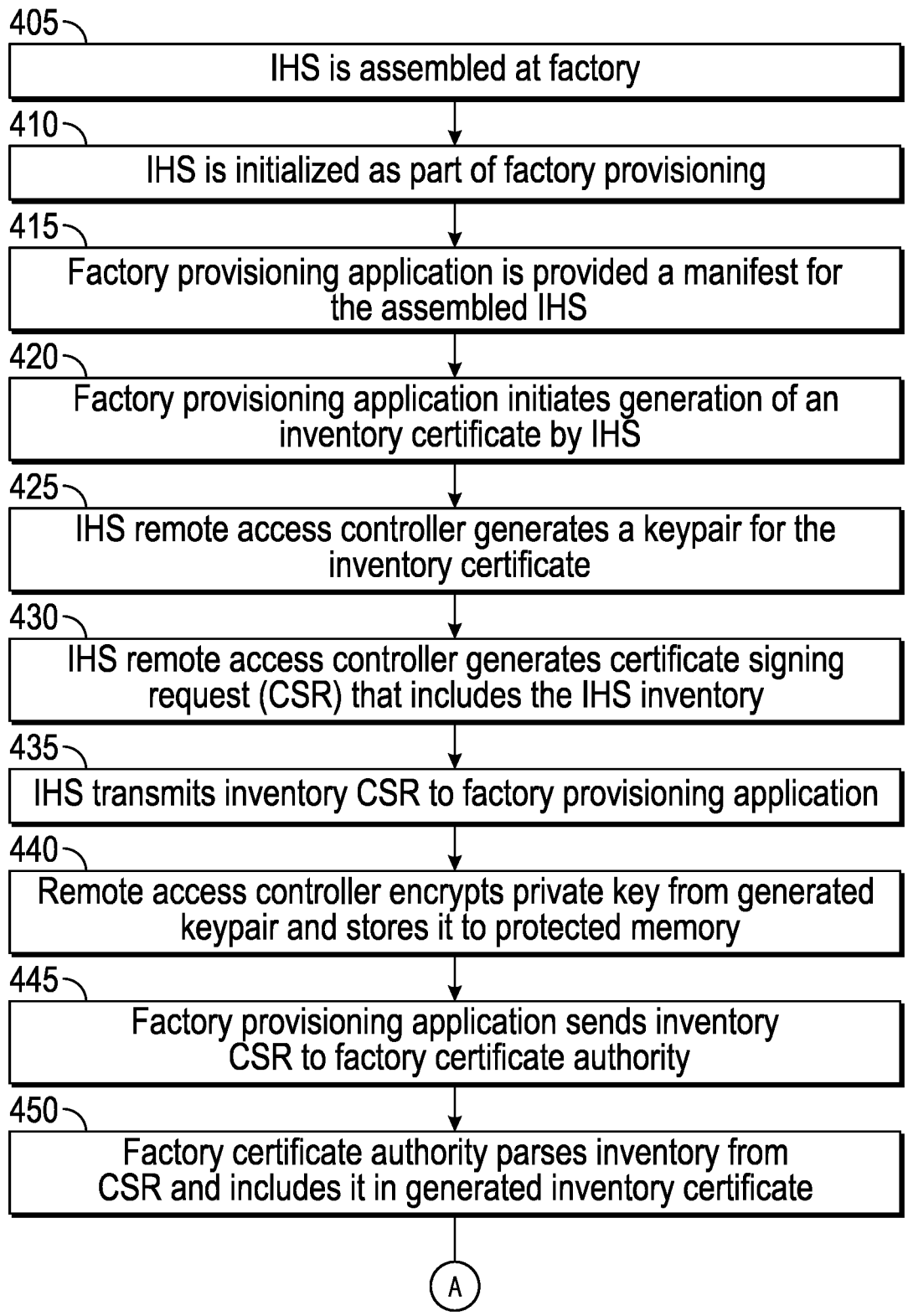
FIG. 4 is a flowchart describing certain steps of a method, according to some embodiments, for assembly and provisioning of an IHS in a manner that supports tracking of hardware components of the IHS.
Figure 4:
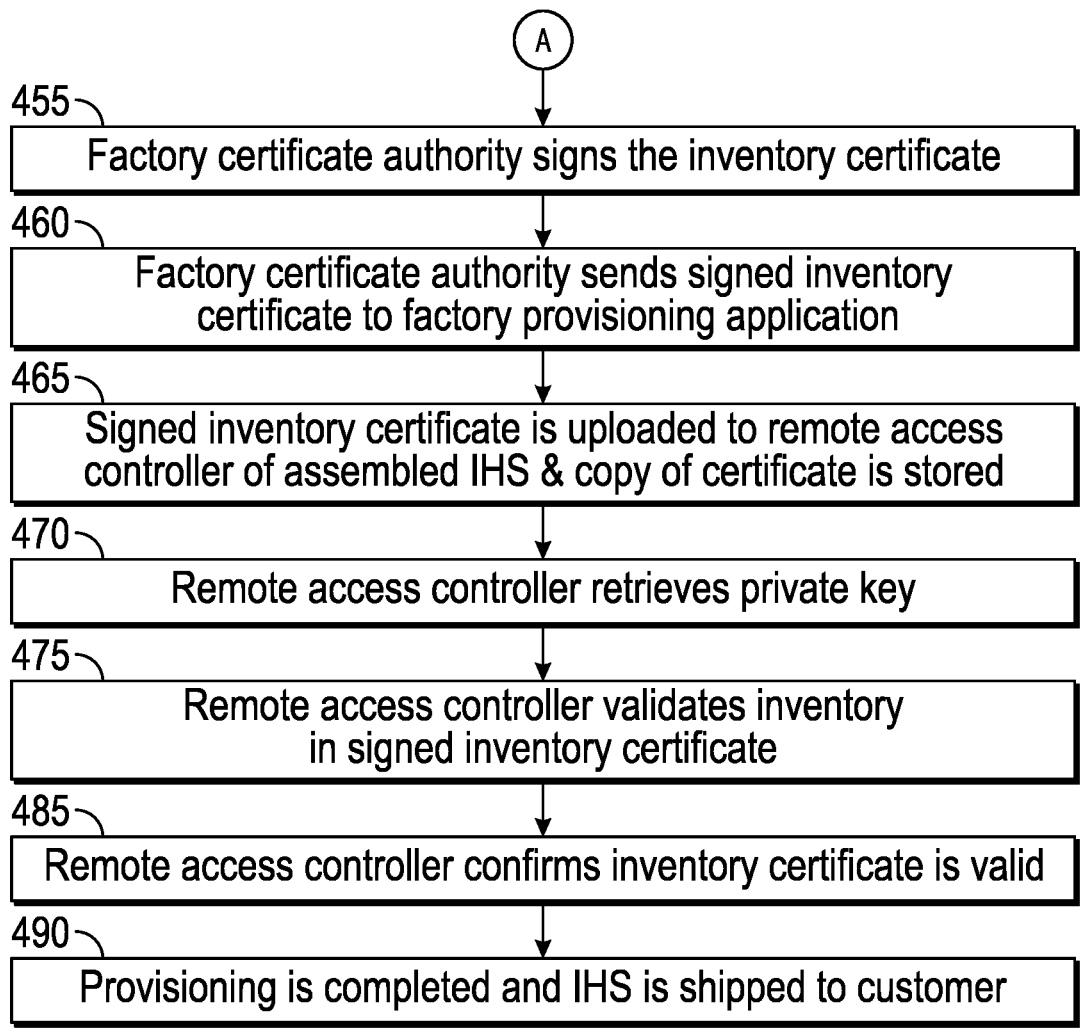

FIG. 3 is a swim lane diagram illustrating certain responsibilities of components of a system configured according to certain embodiments for factory provisioning of an IHS in a manner that supports validation or verification of the hardware components of the IHS and of secure modifications to the IHS. FIG. 4 is a flowchart describing certain steps of a method, according to some embodiments, for assembly and provisioning of an IHS in a manner that supports the validation or verification of the hardware components of the IHS and of secure modifications to the IHS.

The method of FIG. 4 may begin at block 405 with the factory assembly of an IHS, such as the assembly of a server described with regard to FIGS. 1 and 2. In some instances, an IHS may be manufactured using a factory process that includes multiple phases of assembly, validation, and provisioning that must be completed before the IHS is supplied to a customer.

An IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. The installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application, where this factory provisioning application may run on one or more servers and may interface with an IHS that is being provisioned once a requisite amount of firmware and software has been installed to the IHS.

A manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number.

At block 415, a manifest generated during assembly of an IHS is provided to the factory provisioning application that is being used to provision the assembled IHS. Based on this hardware manifest information, at block 420, the factory provisioning application may also initiate the generation of an inventory certificate that may be used to validate that the detected hardware components of the IHS are the same hardware components that were installed during the factory assembly of the IHS.

Once an IHS has been shipped to a customer, replacement hardware or new hardware may be installed to an IHS. In response to such modifications, the inventory certificate generated during factory provisioning of an IHS may be replaced or updated by a remote validation or verification service. Such replacement or updated inventory certificates may then be utilized by a customer to confirm that the hardware installed by the customer is the same hardware components supplied to the customer.

As previously described, an IHS may include a RAC that provides capabilities for remote management of an IHS, where these remote management capabilities may include sideband management of various hardware components of an IHS.

FIG. 3 shows that the generation of an inventory certificate for a newly assembled IHS, at 325, may be initiated via a request from the factory provisioning application 305 to RAC 310 of the IHS. RAC 310 may include cryptographic capabilities that operate within the root of trust of the IHS and that include the ability to generate cryptographic key-pairs. Utilizing such cryptographic capabilities, at block 425, RAC 310 initiates the generation of an inventory certificate by generating a cryptographic key pair for use in validating the authenticity of inventory information that is included in an inventory certificate.

At block 430 and at 330, RAC 310 generates a certificate signing request (CSR) for a digital identity certificate, where the request specifies the public key of the key pair generated by the RAC. The request also specifies the factory installed hardware inventory from the manifest that was generated during assembly of the IHS. The factory installed hardware inventory information included in the CSR may be signed by RAC 310 using the private key from the generated keypair.

At block 435 and at 335, the CSR for the requested inventory certificate is transmitted to the factory provisioning application 305 by RAC 310. At block 440, the RAC safeguards the private key from the generated key pair. In some embodiments, the RAC may encrypt the private key using the HRK of the IHS and may store the encrypted key to a protected memory, such as an RPMB.

Upon receiving the certificate signing request from RAC 310, at block 445 and at 340, factory provisioning application 305 submits the CSR for signing by factory certificate authority 315. In some embodiments, the factory provisioning application 305 specifies a factory key to be used by factory certificate authority 315 in signing the inventory certificate. For instance, the factory provisioning application may include the name of a trusted certificate associated with a factory key as an attribute of the CSR that is transmitted to the factory certificate authority 315.

Upon receipt of the CSR, at block 450, the factory certificate authority 315 parses from the CSR: the hardware inventory information, the public key generated by the RAC, and the information specifying the requested signing key. Based on the information parsed from the CSR, the factory certificate authority 315 generates a digital identity certificate, referred to herein as an inventory certificate, that is associated with the public key provided by the RAC and that specifies the factory installed hardware inventory of the IHS. This inventory certificate may be later updated or replaced in response to replacement of one or more hardware components of the IHS or in response to additional hardware components being installed in the IHS.

As indicated in FIG. 3, at 345, factory certificate authority 315 submits the generated inventory certificate for signing by hardware security module 320 that may be a dedicated hardware component of a factory provisioning server that safeguards cryptographic keys and implements cryptographic operations utilized in the factory provisioning process. Factory certificate authority 315 may also specify a certificate name associated with a signing key that is maintained by hardware security module 320. At 350, hardware security module 320 utilizes the private key associated with the specified certificate in order to digitally sign the submitted inventory certificate, which includes the inventory of the factory installed hardware components of the IHS. The signed inventory certificate is then returned to factory certificate authority 315 by hardware security module 320.

Once the inventory certificate has been signed, at block 460 and at 355, the signed inventory certificate is transmitted from factory certificate authority 315 to factory provisioning application 305. As indicated in FIG. 3 at 357, factory provisioning application 305 may store a copy of the signed inventory certificate. In some instances, the copy may be saved to a data store utilized in providing ongoing support of the IHS once it has been shipped and has been deployed by a customer. Using this stored copy of the signed inventory certificate, a trusted entity providing ongoing support of IHS may validate that an inventory of installed hardware reported by the IHS matches the factory installed hardware of the IHS.

In addition, the trusted entity may utilize the stored inventory certificate to provide the IHS with a new or updated inventory certificate that reflects replacement and/or new hardware that was supplied for installation in the IHS. Using the inventory certificate that includes updated inventory information, an administrator may confirm that a hardware modification was made using a genuine component that was supplied by a trusted entity.

At block 465 and at 360, the signed inventory certificate is than loaded to the assembled IHS. As indicated in FIG. 3, the signed inventory certificate may be uploaded to a RAC 310 of the assembled IHS such that the signed inventory certificate may be stored to a nonvolatile memory or other persistent storage that is accessible by RAC 310 independent from the OS of the IHS. In other embodiments, the signed inventory certificate may be uploaded without reliance on RAC 310 to another non-volatile memory of the IHS.

Some embodiments may continue, at 365, with the validation of the signed inventory certificate by RAC 310. Using the public key from the generated keypair, at block 475, RAC 310 decrypts the signature included by RAC 310 in the CSR and confirms that the inventory information included in the signed inventory certificate matches the inventory information that was submitted in the certificate signing request, thus validating the integrity of the generation of the signed inventory certificate.

At block 485, RAC 310 confirms that the inventory included in the signed inventory certificate is valid and, at 370, RAC 310 confirms the validity of the inventory certificate with a notification to factory provisioning application 305. With the generation and validation of the signed inventory certificate completed, additional factory provisioning of the assembled IHS may be completed and, at block 490, the assembled IHS may be shipped from the factory to a customer.

Upon delivery of the IHS, systems and methods described herein may provide a customer with the capability of validating that the delivered IHS includes only hardware components that were installed at the factory during manufacture of the IHS. These embodiments thus support an initial validation of the secure assembly and delivery of an IHS. Once an IHS has been deployed, however, various components of the IHS may be replaced and new components may be installed to the IHS. Accordingly, upon modification of the components of an IHS, embodiments also provide a customer with the capability of validating that the hardware installed in the IHS later is the same hardware that was supplied to the customer by a trusted entity.

Figure 5:
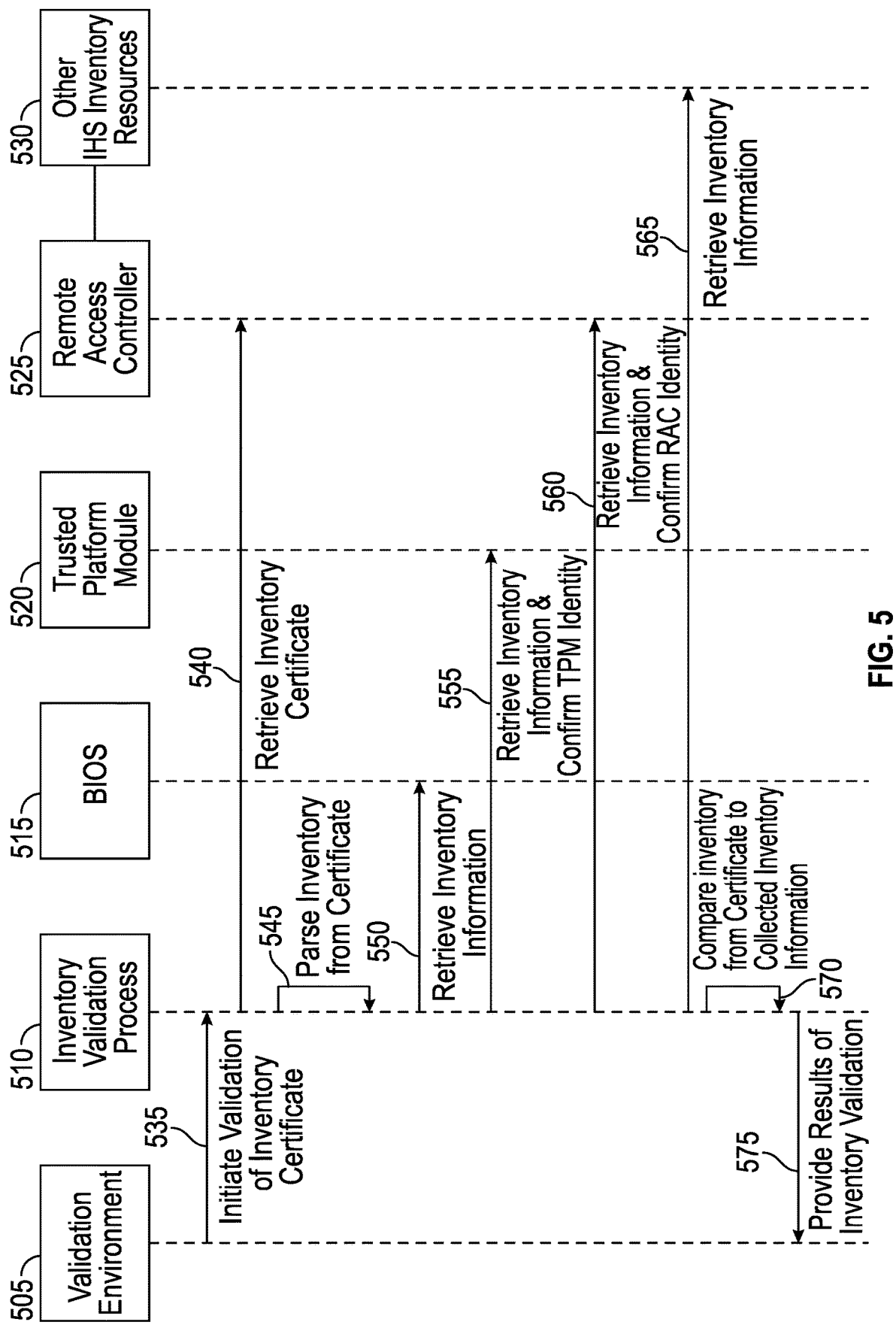
FIG. 5 is a swim lane diagram illustrating certain responsibilities of components of an IHS configured according to certain embodiments for validation and tracking of hardware components of the IHS.
Figure 6:
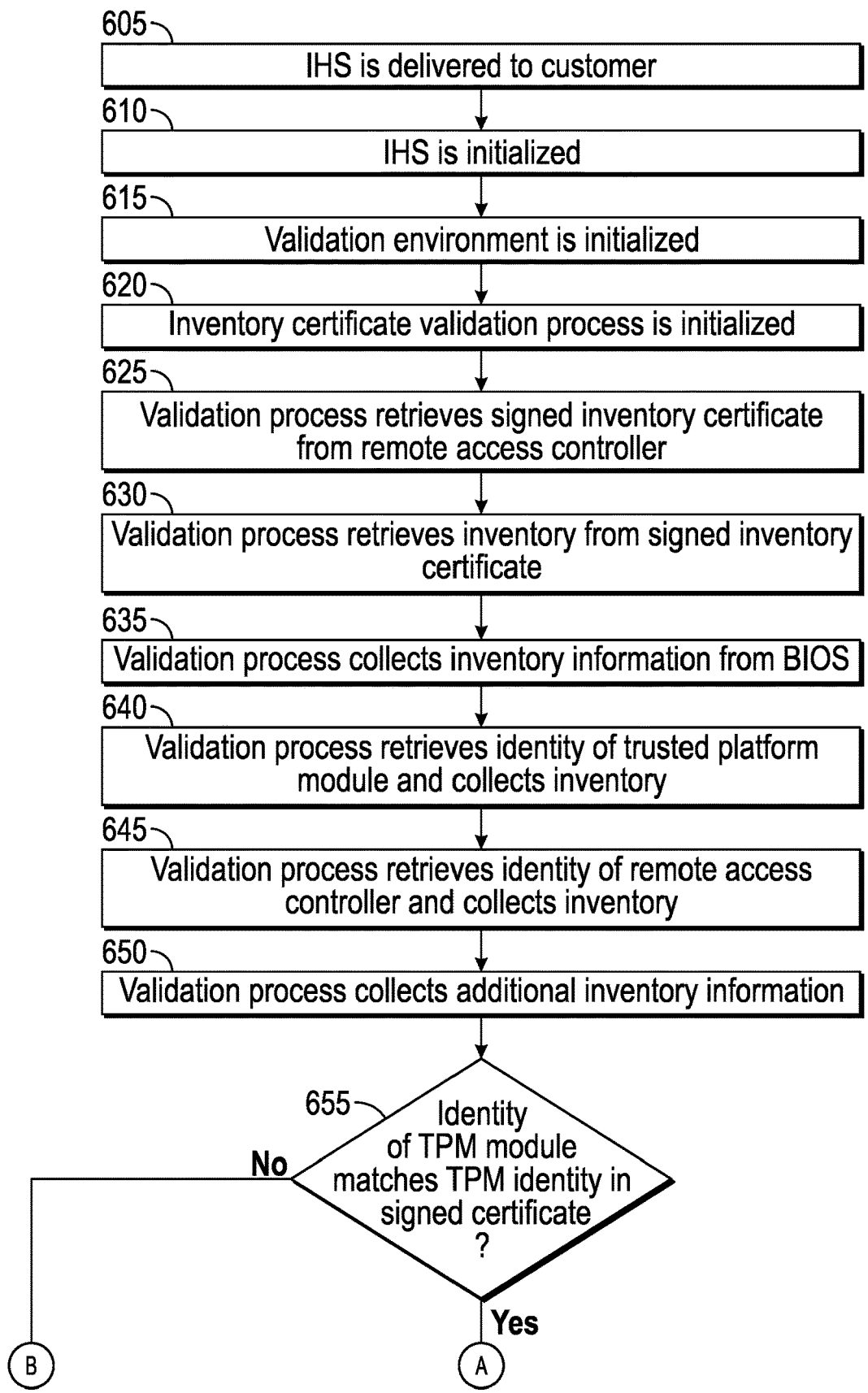
FIG. 6 is a flowchart describing certain steps of an additional method, according to some embodiments, for validation and tracking of hardware components of an IHS.
Figure 6:
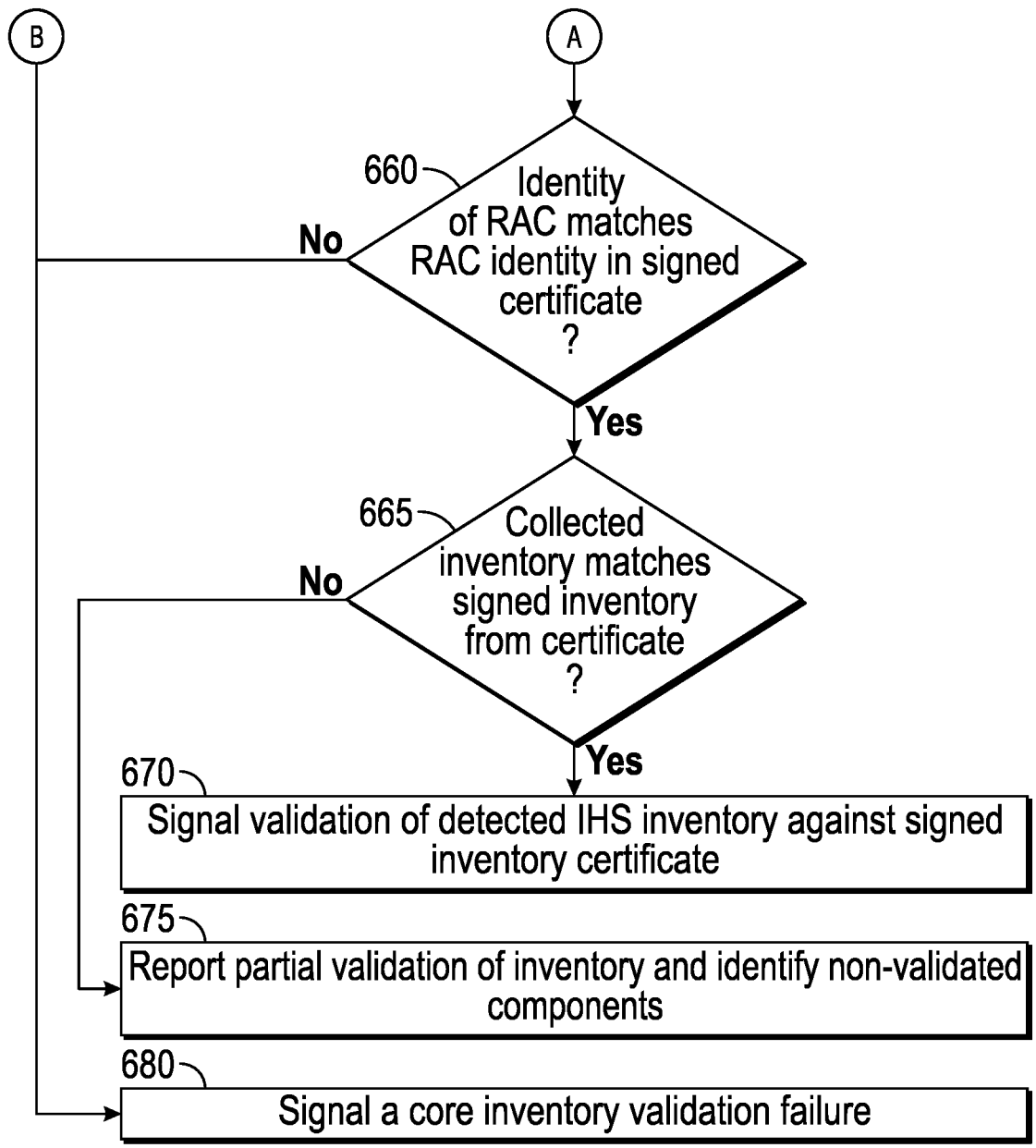

FIGS. 5 and 6 describe embodiments for use of an inventory certificate in the validation of an IHS as including only genuine hardware components, where the inventory certificate may be an original inventory certificate generated during factory provisioning of the IHS, or may be an updated/new inventory certificate that has been generated by a remote validation service in response to modifications to the hardware components of an IHS. Further below, FIG. 7 describes the generation of new and updated inventory certificate by a remote validation service in response to modifications to the hardware components of an IHS.

Particularly, FIG. 5 is a swim lane diagram illustrating certain responsibilities of components of an IHS configured according to certain embodiments for use of an inventory certificate in the validation of the hardware components of the IHS. FIG. 6 is a flowchart describing certain steps of a method, according to some embodiments, for use of an inventory certificate in the validation of the hardware components of the IHS.

The method of FIG. 6 may begin at block 605, with the delivery of an IHS to a customer, where the IHS has been assembled and provisioned according to the procedures set forth above. In particular, the delivered IHS has been provisioned at the factory to include a signed inventory certificate that specifies the factory installed hardware components of the IHS.

Upon receiving an IHS configured in this manner, at block 610, the IHS may be unpacked, assembled, and initialized by an administrator. In some instances, an IHS may be ready for immediate deployment by a customer. In other instances, an IHS may require further provisioning by customer before it is deployed, such as for operation within a particular data center. As such, in various situations, an IHS may be unpacked, assembled, and initialized to deploy the IHS or to prepare it for further provisioning.

At block 615, the IHS has been powered and the validation or verification process is initialized. In some instances, the validation process may be initialized as part of the initial provisioning of an IHS by a customer. In other instances, the validation process may be initialized upon the customer installing new and/or replacement hardware components in the IHS.

In some embodiments, the validation process may run within a pre-boot environment, such as a PXE (Preboot eXecution Environment) operating environment. For example, a PXE operating environment in which a validation process runs may be retrieved from a network location and may be executed using the processing and memory capabilities of the IHS. Additionally, or alternatively, the PXE operating environment may be retrieved using secure protocols, such as HTTPS, to assure the integrity of the operating environment instructions that are utilized.

In some embodiments, a pre-boot operating environment in which the validation process runs may include an operating environment that is executed by the RAC of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. The diagnostic mode may involve re-booting the IHS to a diagnostic environment and/or it may run within the OS of the IHS.

Accordingly, some embodiments may support the described hardware validation procedures as a feature available within the OS. In such embodiments, the OS may be configured to periodically conduct the described hardware validation or verification procedures, such as on a daily or weekly basis. The OS may likewise be configured to conduct the hardware validation procedures in response to a detected security notification, such as a notification that a process is attempting to access a protected resource.

In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

At block 620 and as indicated at 535 of FIG. 5, an inventory certificate validation process 510 is initiated within a validation environment 505 that may include a pre-boot environment, a diagnostic environment or other environment supporting the validation process. Inventory certificate validation process 510 operates based on validated instructions, such as based on instructions that, when used to calculate a hash value, are confirmed to correspond to a value stored in an immutable memory of the IHS during its factory provisioning. In this manner, inventory certificate validation process 510 may be added to the root of trust of the IHS.

At block 625 and as indicated at 540, inventory certificate validation process 510 retrieves the signed inventory certificate from RAC 525 or from a persistent memory of the IHS. As described above, the factory provisioning process may include uploading the signed inventory certificate to the RAC or to a persistent memory of the IHS. In response to modifications to the hardware components of an IHS, an updated/new signed inventory certificate may be provided by a remote validation service and may be uploaded to a persistent memory of the IHS, in some cases via a RAC of the IHS.

At block 630 and as indicated at 545, inventory certificate validation process 510 parses the hardware inventory information from the signed inventory certificate. Using the public key provided in the signed inventory certificate, inventory validation process 510 may confirm the integrity of the inventory information that is included in the signed inventory certificate.

In some scenarios, inventory certificate validation process 510 may commence by collecting an inventory of the detected hardware components of the IHS. In some instances, this collection of inventory information may be initiated earlier by the inventory certificate validation process, such as during initialization of the IHS. At block 635 and as indicated at 550, inventory certificate validation process 510 may query BIOS 515 of the IHS for an inventory of hardware components that have been detected by BIOS 515.

At block 640 and as indicated at 555, inventory certificate validation process 510 may retrieve additional hardware inventory information from Trusted Platform Module (TPM) 520 of the IHS. In some instances, TPM 520 may identify hardware components that are also identified by BIOS 515. However, in some instances, TPM 520 may identify certain hardware components, such as secure memory modules, that are not identified by BIOS 515.

TPM 520 may serve to establish an initial hardware root of trust in an IHS such that the hardware components within this root of trust operate using validated software instructions. Accordingly, in some embodiments, inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation or verification procedures.

At block 645 and as indicated at 560, inventory certificate validation process 510 may retrieve additional hardware inventory information from RAC 525. As with TPM 520, RAC 525 may provide redundant identification of some hardware components and may provide exclusive identification of other hardware components, such as internal memories, management controllers or logic units utilized by the RAC 525.

Inventory certificate validation process 510 may compare identity information for the detected RAC 525 against the RAC identity information that is parsed from the inventory certificate at block 545. In some instances, the detection of any discrepancies between the identity of the RAC specified in inventory certificate and the identity reported by RAC 525 may also result in terminating any further validation procedures.

At block 650 and as indicated at 565, inventory certificate validation process 510 retrieves any additional inventory information from any other data sources, such as directly from the processor of the IHS or from a CMC of a chassis in which the IHS has been installed. Upon completion of the collection of the detected hardware components of the initialized IHS, at block 570, inventory certificate validation process 510 compares the collected inventory information against the inventory information that is parsed from the signed inventory certificate.

Accordingly, at block 655, inventory certificate validation process 510 may confirm the identity of the detected TPM against the identity of the TPM reported in the signed inventory certificate. If the identity of the TPM is successfully validated, validation may continue at block 660. Conversely, if the identity of the TPM is not validated, at block 680, inventory certificate validation process 510 may signal a core inventory validation failure since any discrepancies between the identity of the factory installed TPM and the TPM that has been detected in the initialized IHS signals a potential compromise in the root of trusted hardware components of the IHS.

At block 660, inventory certificate validation process 510 may confirm the identity of the detected RAC against the identity of the RAC reported in the signed inventory certificate. If the RAC is successfully validated, validation may continue at block 665. Otherwise, if the identity of the RAC is not validated, at block 680 inventory certificate validation process 510 may signal a core inventory validation failure. Discrepancies between the identity of the factory installed RAC and the RAC detected in the initialized IHS signal a potential compromise of the root of trust of the IHS.

At block 665, inventory certificate validation process 510 continues the comparison of the detected hardware components of the initialized IHS against the identities of the hardware components that are included in the signed inventory certificate. If the unique identifiers of the detected hardware components of the initialized IHS match the identifiers of the factory installed hardware components from the signed inventory certificate, at block 670 the inventory certificate validation process signals a successful validation of the detected hardware of the IHS. The customer receiving delivery of the IHS is thus assured that the IHS is operating using only hardware components that were installed at the factory during manufacture of the IHS, or that were supplied by a trusted entity.

If discrepancies are detected between the detected hardware components of the initialized IHS and the hardware components reported in the signed inventory certificate, at block 675 a partial validation of the hardware inventory of the IHS may be reported. In some instances, such discrepancies may result from failure to detect hardware components that are specified in the signed inventory certificate. In other instances, such discrepancies may result from mismatched identity information between the detected hardware components and the components listed in the signed inventory certificate, such as discrepancies in the serial numbers or other unique identifiers associated with a hardware component. In yet other instances, such discrepancies may result from the detection of hardware components that are not present in the signed inventory certificate. In all cases, any such discrepancies may be reported, thus allowing an administrator to investigate further.

Figure 7:
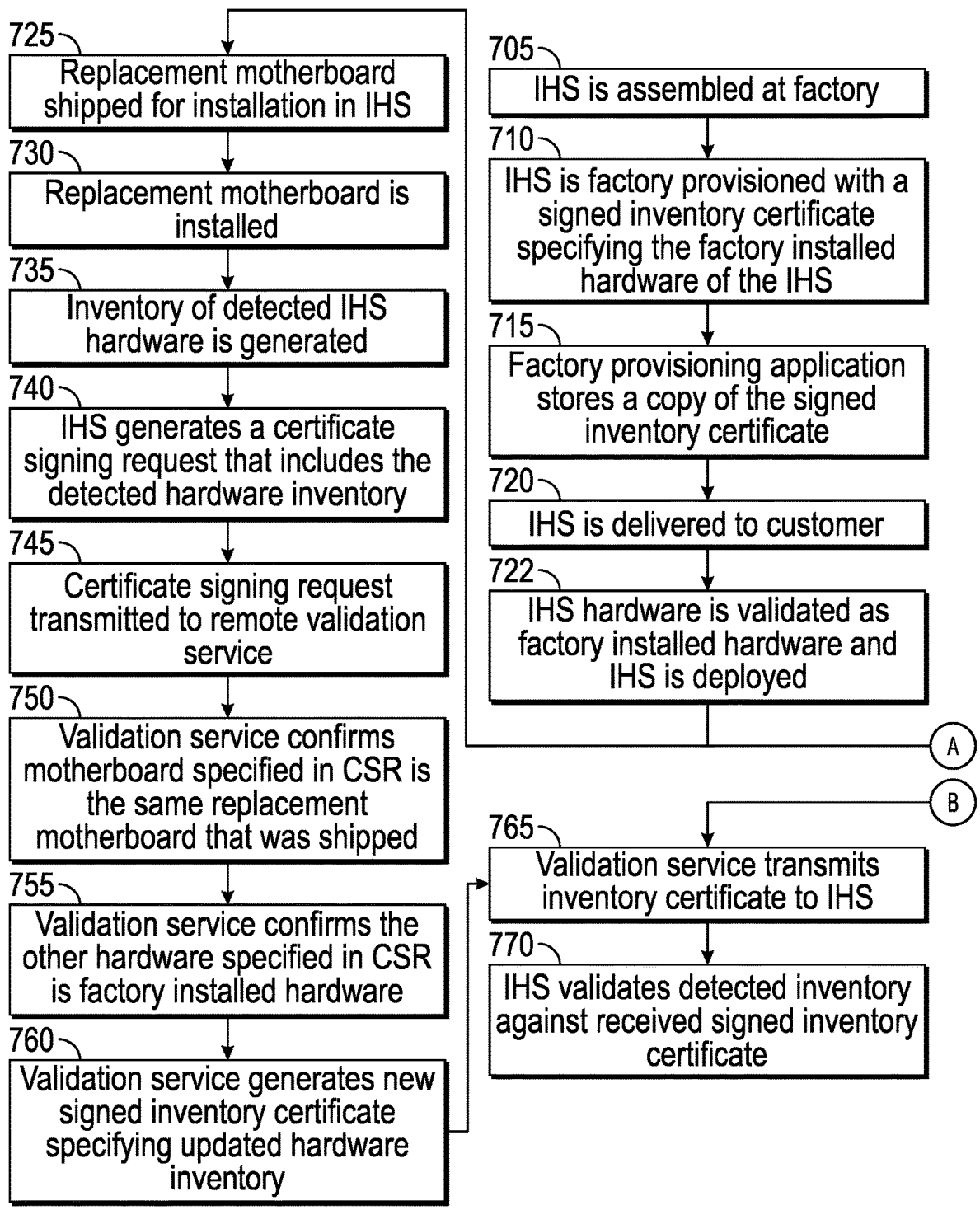
FIG. 7 is a flowchart describing certain steps of an additional method, according to some embodiments, for validating or verifying secure modifications to an IHS.
Figure 7:
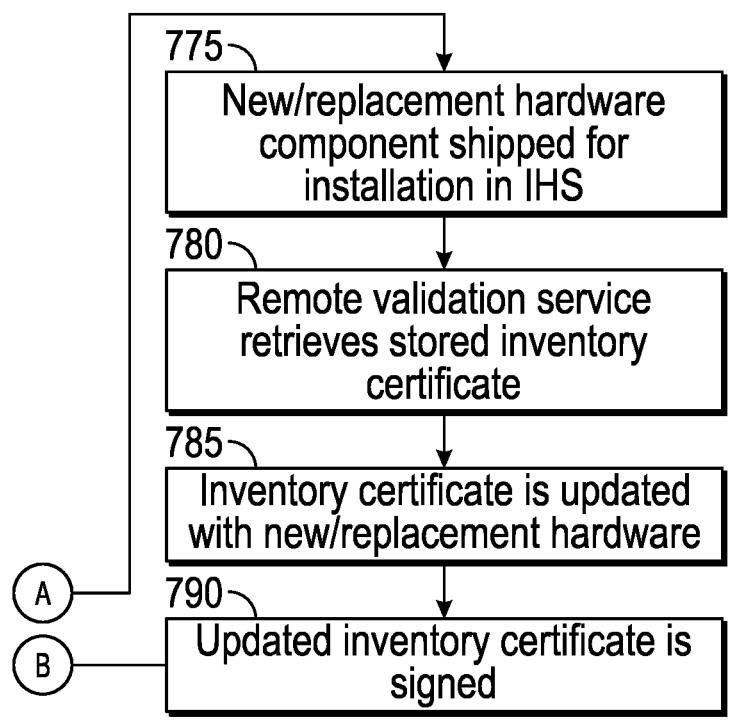
Figure 8:
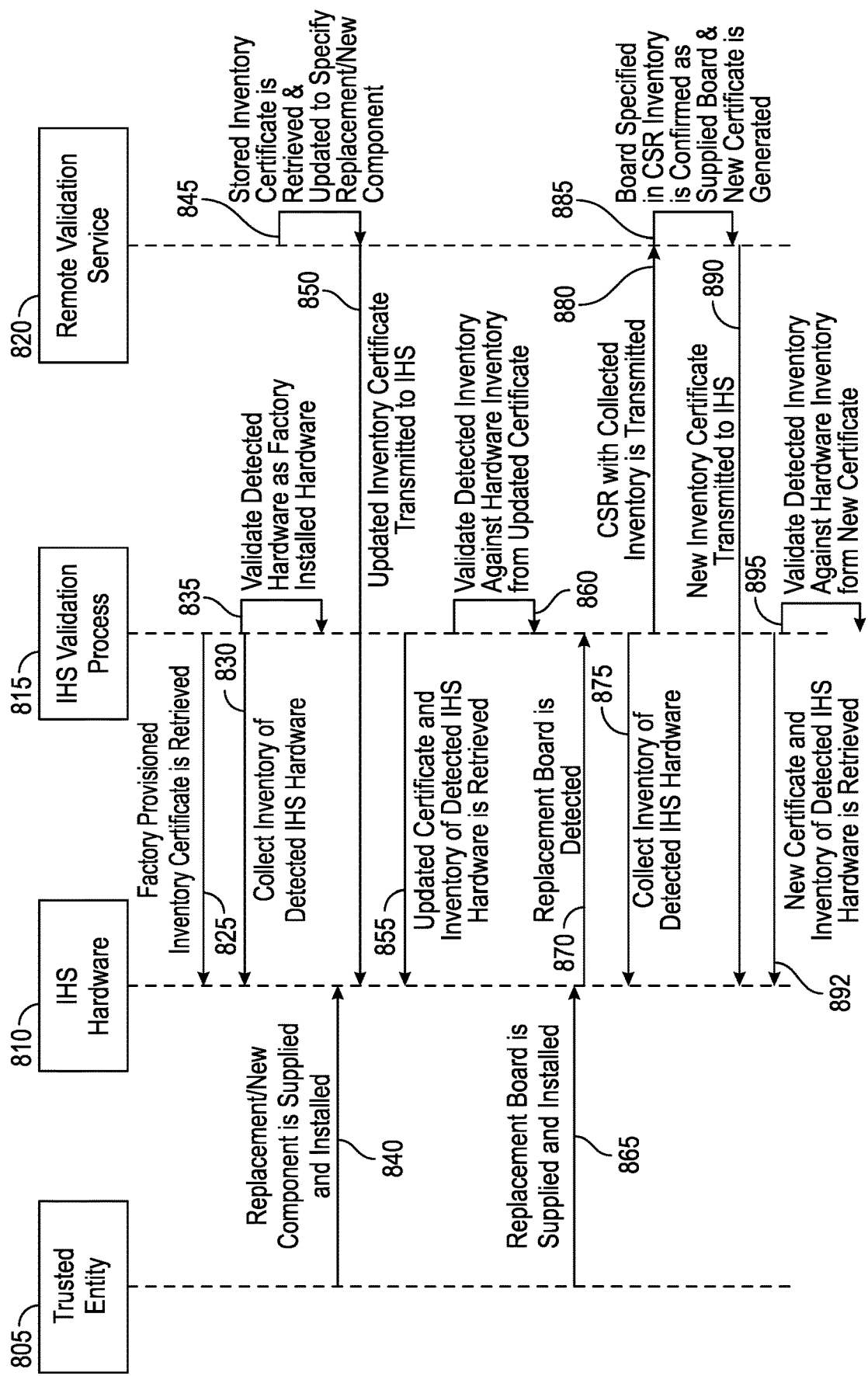
FIG. 8 is a swim lane diagram illustrating certain responsibilities of components of a system configured according to certain embodiments for validation or verification of secure modifications to an IHS.

FIG. 7 is a flowchart describing certain steps of an additional method, according to some embodiments, for validating secure modifications to an IHS, and in particular for generating updated/new inventory certificates in response to modifications to the hardware components of the IHS. FIG. 8 is a swim lane diagram illustrating certain responsibilities of components of a system configured according to certain embodiments for validation of secure modifications to an IHS.

The method of FIG. 7 may begin at block 705 with the factory assembly of an IHS. The IHS is factory-assembled to include various uniquely identifiable hardware components that may each be identified within a manifest that is generated as part of this factory assembly. At block 710, factory provisioning of the IHS generates a signed inventory certificate that specifies the factory installed hardware components of the IHS and is signed by a factory certificate authority, such as described above.

Upon generation of the signed inventory certificate, the factory provisioning process may upload the certificate to a persistent memory of the IHS, such as via a RAC of the IHS. The inventory certificate may be used by a customer receiving delivery of the IHS to validate that the IHS operates using only factory installed hardware components of the IHS.

In many scenarios, however, once a new IHS has been validated and deployed by a customer, over time various modifications may be made to the IHS. For instance, hardware components of the IHS may be replaced due to component failures or to upgrade the capabilities of the IHS. In other instances, additional hardware components may be added to the IHS to expand its capabilities.

For use in later validation that such modifications to the hardware components of an IHS are made using genuine hardware components supplied by a trusted entity, at block 715 the factory provisioning application stores a copy of the signed inventory certificate that has been uploaded to the persistent memory of the IHS. Once the factory provisioning of the IHS has been completed, at block 720, the IHS is packaged and shipped to a customer.

Upon receiving shipment of the IHS at block 722, the customer may validate that the detected hardware components of the IHS include only the factory installed hardware. As indicated in FIG. 8, this validation may include a validation process 815 of the IHS retrieving, at 825, a factory provisioned inventory certificate from its stored location. The validation process 815 then collects, at 830, an inventory of detected hardware components of the IHS based on queries supported by various hardware components 810 of the IHS. Once the IHS has been confirmed, at 835, to be operating using only validated hardware, the IHS may then be deployed. After some time, modifications may be made to the hardware components of the IHS.

Various types of modifications may be made to an IHS. One of such modification is to replace a motherboard or backplane of an IHS to which processors and other core components of the IHS may be fixed. For instance, components such as a RAC, a TPM and secure memory devices may be fixed to a motherboard of an IHS. Such core components may be utilized to establish a root of trust that includes hardware components that are operating using validated instructions.

Moreover, systems and methods described herein may cryptographically bind a signed inventory certificate to components operating within this root of trust of an IHS. For instance, cryptographic capabilities of a RAC and/or a TPM may be used to digitally sign inventory information that is included in an inventory certificate. In scenarios that require replacement of a motherboard, backplane, daughter card or other circuit board of an IHS that includes one or more of such hardware components to which an inventory certificate is digitally bound, an existing inventory certificate that is bound to one of the components cannot be validated by the replacement board that will include different cryptographic components.

In such a scenario, at block 725 and at 865, a replacement motherboard or other circuit board that includes components to which an inventory certificate may be digitally bound is shipped to a customer for installation in an IHS or is sold to a customer via a retail transaction. The motherboard may be supplied by a trusted entity 805 that may include the manufacturer of the IHS, a retailer that sells replacement parts on behalf of the manufacturer, or by a trusted third party providing ongoing support of the IHS.

At block 730, the replacement motherboard is received by the customer and is installed in the IHS. The replacement motherboard supplied by trusted entity 805 may be configured to initiate the described validation process upon being booted for the first time, where the replacement mother may be configured through provisioning of the motherboard with boot loading instructions that initiate the validation process 815 that pertains to motherboard validation.

At 870, the IHS is booted and validation process 815 is initiated, where it triggers the described procedures for validation or verification of a replacement motherboard. The IHS is initialized and an inventory of the detected hardware components of the IHS is generated by the validation or verification process. Now operating using the replacement motherboard, at 875, validation process 815 queries the BIOS, RAC and/or TPM of this replacement motherboard to generate an inventory of detected hardware components that are operating in the IHS.

At block 740, the IHS generates a CSR that includes the detected hardware inventory of the IHS. In some embodiments, this CSR may be generated by the RAC of the IHS in the same manner as described with regard to the factory provisioning process of FIGS. 4 and 5, where the RAC utilizes its cryptographic capabilities to generate a key pair. The public key from this key pair is included in the CSR, thus binding the requested inventory certificate to this RAC and consequently to this replacement motherboard on which the RAC is mounted.

At block 745 and at 880, the CSR is transmitted to a remote validation service 820. In some embodiments, the hardware inventory and the CSR may be generated via a validation process 815 that operates within the IHS root of trust. In embodiments where the CSR is generated by a RAC, the RAC may transmit the CSR to a remote validation service 820 without booting the OS of the IHS and may utilize out-of-band data collection, networking and validated instructions to generate and transmit the CSR to the remote validation service.

In some embodiments, remote validation service 820 receiving the CSR may be a service that is provided by the manufacturer of the IHS. In other embodiments, remote validation service 820 may be supported by a trusted third-party that has been contracted to provide ongoing support of the IHS and which has been granted access to data such as the factory installed hardware of the IHS and hardware components that have been supplied by trusted entities 805 for installation in the IHS.

At block 750, validation service 820 receives the CSR that is transmitted by the IHS. Validation service 820 extracts the hardware inventory information included in the CSR and identifies the motherboard that is reported in this hardware inventory. At 885, validation service 820 compares the identity of this motherboard reported in the CSR against the identity of the motherboard that was supplied by trusted entity 805 to the customer at 725 and at 865. If the identity of the reported motherboard matches the identity of the supplied motherboard, the customer may be assured that the installed motherboard is a genuine component that was supplied by a trusted entity 805. However, if the identity of the detected motherboard does not match the identity of the supplied motherboard, validation service 820 may signal a core validation failure and may notify the customer that the installed motherboard could be a compromised component.

If the identity of the replacement motherboard specified in the CSR is successfully validated, at block 755 validation service 820 may also validate the other detected hardware components of the IHS. In some embodiments, validation service 820 may compare the hardware inventory information included in the CSR against the factory installed hardware inventory included in the original inventory certificate that was stored, at block 715, during factory provisioning of the IHS. Such a comparison may identify any detected hardware components reported by the IHS that are not factory installed components and may also identify any factory installed components that are not reported as operating by the IHS. Detected discrepancies may be reported for further investigation by the customer and certain discrepancies may signal a core validation failure that may be reported to the customer.

If the hardware inventory information reported in the CSR is validated as including only factory installed hardware components and genuine new/replacement components that were supplied by trusted entity, at block 760 validation service 820 proceeds to generate a new signed inventory certificate that specifies the updated hardware inventory that was reported in the CSR. The new signed inventory certificate that is generated by the validation service 820 may be signed by a factory certificate authority that utilizes a hardware security module. In some embodiments, the new signed inventory certificate may be signed by a different certificate authority that is utilized by the manufacturer of the IHS or by trusted entity 805 that is providing ongoing support of IHS.

At block 765 and at 890, remote validation service 820 transmits the new signed inventory certificate to the IHS. In some embodiments, the RAC that generated the CSR may receive the new signed inventory certificate from remote validation service 820. In some embodiments, validation process 815 may be configured to halt further booting of an IHS until a new inventory certificate is provided in response to a CSR that is issued by the validation process 815.

Upon detecting the receipt of a new inventory certificate, at block 770 and at 892, the hardware inventory information included in the new signed inventory certificate may be validated at 895, by validation process 815, as the same hardware inventory that was reported in the CSR. Validation process 815 may also validate the authenticity of the new certificate using the public key of the signing authority utilized by validation service 820 in generating the new certificate.

Upon successful validation of the hardware inventory, validation process 815 may store the new signed inventory certificate to a persistent memory for use in continued validation of the detected hardware components of the IHS during its ongoing use by the customer, such as using the hardware validation process described with regard to FIGS. 5 and 6. For instance, the new inventory certificate may be periodically used to validate that the IHS continues to operate using only factory installed hardware components and hardware components supplied to the customer by trusted entity 805.

As indicated in FIG. 7, in some instances, hardware components may be supplied for installation in an IHS, where these hardware components do not operate within the root of trust of the IHS. For instance, a defective storage drive or a defective network controller of a server IHS may be replaced with new components. In other instances, additional storage drives may be added to an IHS to expand its storage capabilities.

For example, a hardware component of an IHS, such as a storage controller, may be replaced to upgrade the storage capabilities of the IHS. In these instances, such types of components are not motherboard components of an IHS such that their replacement or addition does not affect the cryptographic binding of an inventory certificate to the IHS. Accordingly, the root of trust of an IHS is not affected by replacement or addition of such components.

At block 775 and at 840, a new or replacement hardware component is supplied for installation in an IHS by trusted entity 805, where the hardware component does not alter the cryptographic binding of an inventory certificate to the IHS. In various embodiments, the hardware component may be shipped to a customer for installation in an IHS or may be sold to a customer via a retail transaction. The component may be supplied by trusted entity 805 that may include the manufacturer of the IHS, a retailer that sells replacement parts on behalf of the manufacturer or by a trusted third-party providing ongoing support of the IHS.

At 840, the hardware component is received by the customer and is installed in the IHS. Once the component is installed and the IHS is initialized, in some embodiments, the hardware component may be detected by a hardware validation process 815 and may be identified as a hardware component that is not present in the hardware inventory of the signed inventory certificate that is stored locally by the IHS. The user of the IHS may be notified of the non-validated hardware component and may be prompted to proceed while utilizing a non-validated component or to disable the component until it can be validated as a genuine component that was supplied by trusted entity 805.

At 820, upon a new/replacement hardware component being supplied for installation in an IHS by a trusted entity 805, at block 780, a remote validation service 820 retrieves the signed inventory certificate stored, at block 715, during factory provisioning of the IHS. At block 785, the validation service updates the inventory certificate of the IHS to include the identity of the supplied hardware component. The updated inventory certificate may be re-signed at block 790 by the factory certificate authority or by another certificate authority operated by a trusted entity 805 providing ongoing support of the IHS.

The updated inventory certificate that has been re-signed may be transmitted, at block 765 and at 850, to the IHS by validation service 820. In various embodiments, the updated inventory certificate may be received by validation process 815 of the IHS. The updated inventory certificate may be stored to persistent memory 810 of the IHS such that it replaces or augments the prior inventory certificate.

Upon receipt and retrieval at 855 of the updated inventory certificate, at block 770 validation process 815 may initiate procedures for comparing the detected hardware inventory of the IHS against the inventory reported in the updated inventory certificate. If at 860 the detected hardware inventory of the IHS matches the inventory reported in the updated inventory certificate, the customer may be assured that the installed hardware component is a genuine component that was supplied by a trusted entity.

However, if the new or replacement hardware component installed in the IHS is not identified in the inventory of the updated inventory certificate, the validation process 815 may notify the user that the IHS may be operating with a compromised component that was not supplied by a trusted entity 805. In this manner, the customer may validate that any modifications made to the hardware of an IHS are made using genuine components provided by trusted entities.

As such, in various embodiments, systems and methods described herein enable a user to manually identify component additions and removals, and to generate a corresponding inventory certificate through a locally-setup certificate infrastructure (e.g., by a RAC). Although these component verification processes are well-managed in the factory environment, on a client's premises the same processes have certain vulnerabilities.

For example, on the client's premises, hot-pluggable or hot-swappable devices may not always be properly accounted for by every user. A "hot-pluggable" component is a device that a user can install and then remove while the IHS is running. In some cases, a user may perform administrative tasks before or after installing the device (e.g., mounting a hard drive). Conversely, a "hot-swappable" component is a device that can be removed and replaced with another component while the IHS is running (e.g., a fan, a PSU, etc.).

Other vulnerabilities inherent to manual component verification processes include the addition and/or removal of a device to the IHS during power off state (i.e., "offline"), not enforcing certificate generation/removal after boot, allowing the IHS to operate without capturing changes for indefinite amounts of time, etc. In any of these scenarios, an IHS may be moved from one client location to another and lose track of its devices because updated inventory certificates are not generated instantly.

Moreover, identifying, generating, and removing certificates can be time consuming and error prone when dealt with manually, especially when volumes are high. In some cases, devices may be shown as additions in multiple certificates concurrently because certificates are generated at will and not automated, which means that faulty or compromised components are allowed to migrate from a first IHS to another.

To address these, and other problems, systems and methods described herein may be configured to: (i) add and remove "delta inventory certificates" into a RAC in real-time, by tracking incremental, client-initiated inventory changes through an eventing infrastructure; and to (ii) update delta inventory certificates with the remote validation service through a cloud infrastructure. In various embodiments, a delta inventory certificate may identify a device addition or removal, and it may reflect hardware, firmware, and/or software changes relative to a factory inventory certificate or relative to a previous delta inventory certificate.

Using systems and methods described herein, each change to an IHS's hardware or firmware configuration is validated in an automated fashion, without manual intervention. As the IHS is operated, a resulting chain of delta inventory certificates may be accumulated by its RAC and/or the remote validation service that reflects a history of use of the IHS. As such, these systems and methods may be particularly well suited to capture offline and/or hot-pluggable/hot-swappable component additions and removals across an IHS's lifespan.

Figure 9:
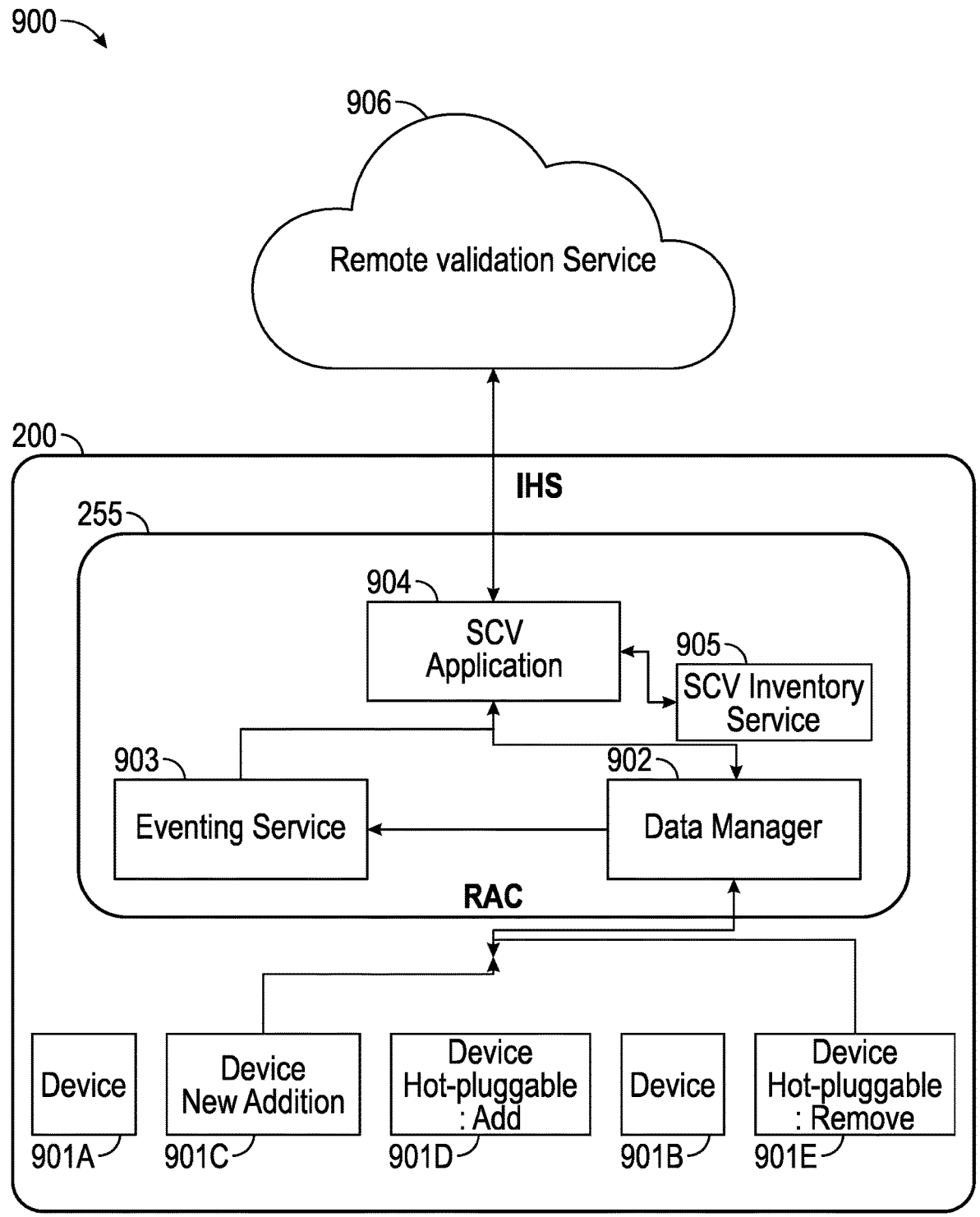
FIG. 9 is a diagram illustrating an example of an eventing infrastructure configured according to certain embodiments to enable real-time management of delta inventory certificates for component validation or verification.

FIG. 9 is a diagram illustrating an example of eventing infrastructure 900 configured to enable real-time management of delta inventory certificates for component validation. As shown in infrastructure 900, IHS 200 includes several components 901A-E. Components 901A and 901B may be coupled to IHS 200. Component 901C may represent a device that has been added to IHS 200, for example, while IHS 200 was powered off, and that was then discovered during a booting process. Component 901D may be a hot-pluggable device added to IHS 200 and component 901E may be another hot-pluggable device removed from IHS 200 while IHS 200 is running. For instance, components 901D and 901E may be hot-swappable, such that component 901E is removed and replaced with 901D, both while IHS 200 is running.

RAC 255 includes or otherwise has access to program instructions that, upon execution by service processor 255a, execute secured component verification (SCV) application 904 as well as data manager 902, eventing service 903, and SCV inventory service 905. SCV application 904 is in communication with remote validation service 906 (e.g., service 820 in FIG. 8), for example, using representational state transfer (REST) application programming interface (API) calls, or the like.

Data manager 902 may be configured to inspect, detect, subscribe, retrieve, or receive an indication of a device status update (e.g., insertion, removal, device ID, etc.) from the IHS's BIOS and/or its OS, for example. Data manager 902 may send real-time device updates to eventing service 903, and eventing service 903 in turn determines whether a notification, message, or command should be sent to SCV application 904 for locally generating or requesting (from remote validation service 906) a delta inventory certificate corresponding to the device update.

In some embodiments, eventing service 903 may compare changes detected by data manager 902 against a verification policy to determine whether delta inventory certificate generation should (or should not) be requested. Such a verification policy may be received from remote validation service 906, and it may specifically apply to or exempt certain components, types of components, IHS communication ports, and/or user behaviors, from triggering delta inventory certificate generation.

For example, a verification policy applicable to a particular IHS (e.g., by system ID, serial number, service tag, etc.) may comprise a rule that specifies that a particular device (e.g., by device ID, serial number, etc.), type of device (e.g., mice, keyboards, webcams, etc.), or communication port (e.g., USB, HDMI, etc.) of IHS 200 be exempt from triggering delta inventory certificate generation. Additionally, or alternatively, the rule may include or exclude a component, type of component, or communication port from triggering delta inventory certificate generation based on context information (e.g., location of the IHS at the time of insertion/removal, the time of the insertion/removal, etc.).

Additionally, or alternatively, a rule outlined in a verification policy may include or exclude certain user or device behavior from triggering delta inventory certificate generation. For instance, when data manager 902 receives an indication that a component has been added to or removed from IHS 100 a specified number of times during a given time interval, with a certain periodicity (e.g., every hour), or while a particular user (or type of user) is operating IHS 200, the behavior may be excluded from triggering delta inventory certificate generation. Conversely, if the same behavior occurs with a component, type of component, or communication port that had been previously exempted from triggering delta inventory certificate generation, the verification policy may trigger generation of a delta inventory certificate for each otherwise exempted event.

In operation, RAC 255 may first perform a host boot SCV application 904 may, upon its instantiation, check for availability of a factory inventory certificate, for example, via SCV inventory service 905. In various embodiments, SCV inventory service 305 may locally cache a chain of one or more certificates, including an original factory inventory certificate and any delta inventory certificates generated thereafter.

On availability of a factory inventory certificate, SCV application 904 may initiate a self-extraction of inventory from the certificate and compare against the inventory collected during a Collect System Inventory on Restart (CSIOR) process of RAC 255. Then, upon discovery of additional devices through data manager 902 and eventing service 903, SCV application 904 may check for the availability of any required delta inventory certificates in RAC 255 for the added devices.

In cases where RAC 255 does not contain the sought delta inventory certificate, so long as all applicable verification policies are complied with, SCV application 904 may initiate a delta inventory certificate generation request to remote validation service 906, which then proceeds to generate the requested delta certificate. In situations where a device is removed, SCV application 904 may create a delta inventory certificates for IHS 200 on its own, and it may upload a copy of the same to remote validation service 906.

As such, when components are hot-plugged/swapped into IHS 200, eventing infrastructure 900 is automatically made aware of the change, change details are passed on to eventing service 904, and subsequently to SCV application 904. SCV application 904 may implement any of the previously discussed processes for generating inventory certificates by interacting with remote validation service 906. Then, SCV application 904 may cache the latest delta inventory certificates on RAC 255.

Figure 10:
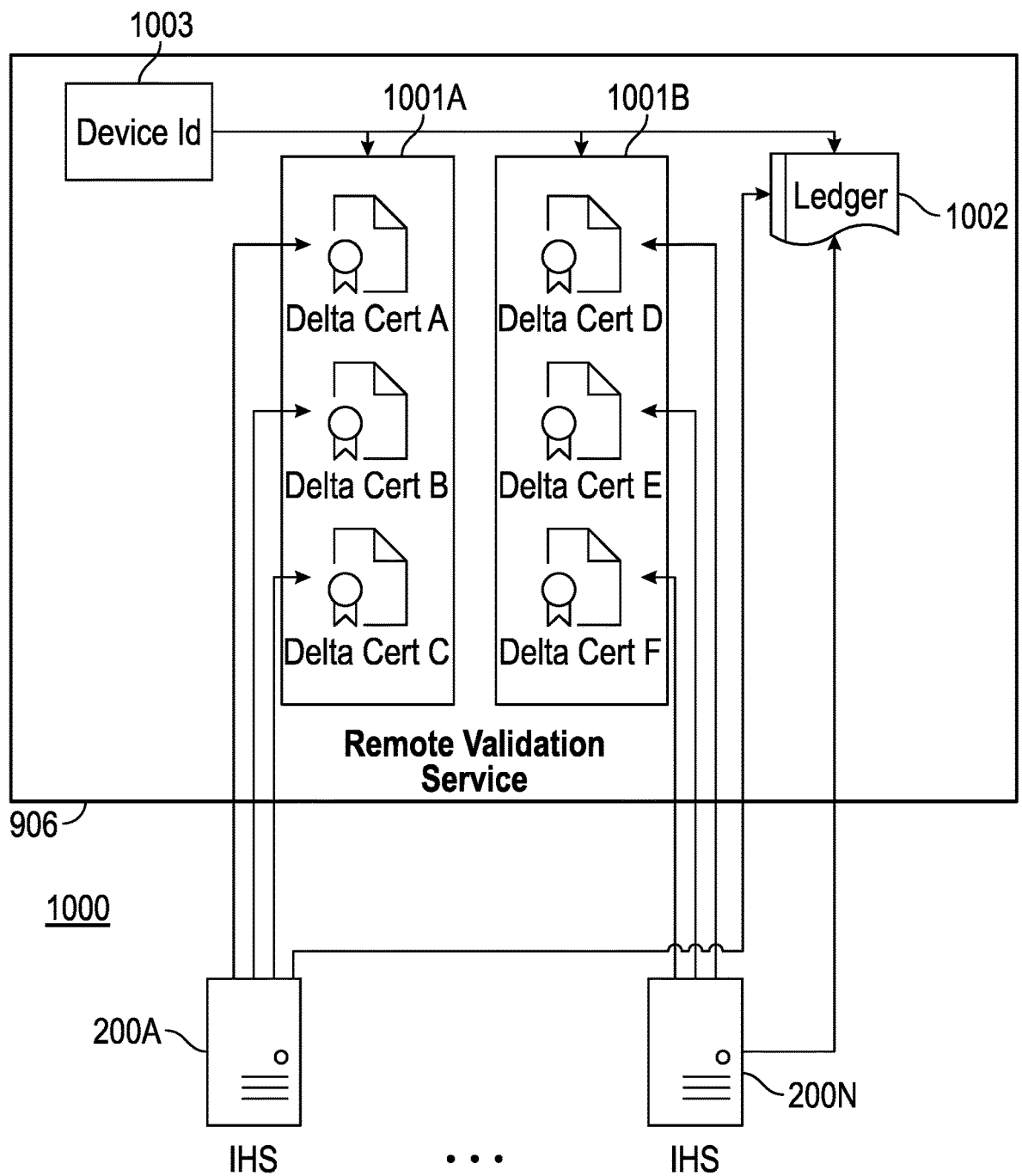
FIG. 10 is a diagram illustrating an example of a cloud infrastructure configured according to certain embodiments to enable the centralized storage management of delta inventory certificates.

FIG. 10 is a diagram illustrating an example of cloud infrastructure 1000 configured to enable the centralized storage of delta inventory certificates. In various embodiments, cloud infrastructure 1000 may be configured to provide remote validation service 906. Particularly, remote validation service 906 includes ledger 1002 and device identification module 1003. RACs in each of IHSs 200A-N are configured to store their respective chains of delta inventory certificates 1001A (certificates A-C) and 1001B (certificates D-F), respectively, in cloud infrastructure 1000.

As such, cloud infrastructure 1000 provides centralized device ledger 1002 that captures insert-remove activities, with each ledger entry being approved by an owning RAC of IHSs 200A-N through public key encryption. Ledger 1002 may also associate anomalies/blacklisted entries against a delta inventory certificate for a particular device.

Moreover, in case the same device is moved between different IHSs, a request for the creation of a delta inventory certificate by a given IHS may be checked against ledger 1002. If ledger 1002 indicates that a device being inserted into the given IHS has been inserted and not yet removed from another IHS, the request for delta inventory certificate creation may be denied or flagged. In some cases, a policy may specify that only selected devices, types of devices, and/or IHSs be subject to this check. In other cases, the policy may specify that selected devices, types of devices, and/or IHSs be exempted from this check.

With a valid tally of insert-remove associations and no reported anomalies, a new delta inventory certificate may be created, followed by a corresponding entry made in ledger 1002. As such, cloud infrastructure 1000 may create valid delta certificates, with a secure ledger, and without redundant delta entries. Moreover, in the case of a server farm or datacenter, cloud infrastructure 1000 may be used to avoid suspicious device migration between IHSs.

As such, systems and methods described herein may provide eventing-based real-time discovery and generation of delta inventory certificates using cloud a based digital certificate locker. These systems and methods may also provide centralized secure ledger management for generating authentic delta inventory certificates.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:
1. An Information Handling System (IHS), comprising:
a processor;
a Remote Access Controller (RAC) coupled to the processor; and
a memory coupled to the RAC, the memory having program instructions stored thereon that, upon execution by the RAC, cause the RAC to:
determine that a component has been added to the IHS, wherein to determine that the component has been added to the IHS, the program instructions, upon execution by the RAC, further cause the RAC to receive an indication from a Basic Input/Output System BIOS) of the IHS that the component has been coupled to the IHS;
in response to the addition, request that a delta inventory certificate be generated by a remote validation service; and
receive a copy of the delta inventory certificate.
2. The IHS of claim 1, wherein the component comprises a hot-pluggable or hot-swappable device.
3. The IHS of claim 1, wherein to determine that the component has been added to the IHS, the program instructions, upon execution by the RAC, further cause the RAC to receive an indication from an Operating System (OS) of the IHS that the component has been coupled to the IHS.
4. The IHS of claim 1, wherein the delta inventory certificate indicates addition of the component relative to a factory inventory certificate.
5. The IHS of claim 1, wherein the delta inventory certificate indicates addition of the component relative to a previous delta inventory certificate.
6. The IHS of claim 1, wherein the program instructions, upon execution by the RAC, further cause the RAC to:
determine that the component has been removed from the IHS; and
create another delta inventory certificate that indicates removal of the component relative to the delta inventory certificate.
7. The IHS of claim 6, wherein the program instructions, upon execution by the RAC, further cause the RAC to transmit a copy of the other delta inventory certificate to the remote validation service.
8. The IHS of claim 7, wherein to transmit the copy of the other delta inventory certificate to the remote validation service, the program instructions, upon execution by the RAC, further cause the RAC to encrypt the copy of the delta inventory certificate.
9. The IHS of claim 7, wherein the remote validation service is configured to maintain a ledger associating each of a plurality of IHSs with a corresponding set of delta inventory certificates.
10. The IHS of claim 9, wherein the remote validation service is configured to store an indication of the other delta certificate associated with an identity of the IHS in the ledger.
11. The IHS of claim 9, wherein the remote validation service is configured to generate the delta inventory certificate, at least in part, in response to a determination by the remote validation service, using the ledger, that the component is not coupled to another one of the plurality of IHS.
12. A hardware memory device having program instructions stored thereon that, upon execution by a Remote Access Controller (RAC) of an Information Handling System (IHS), cause the RAC to:
determine that a component has been removed from the IHS, wherein to determine that the component has been removed from the IHS, the program instructions, upon execution by the RAC, further cause the RAC to receive an indication from a Basic Input/Output System (BIOS) or Operating System (OS) of the IHS that the component has been decoupled from the IHS; and create a delta inventory certificate that indicates removal of the component relative to a factory inventory certificate or a previous delta inventory certificate.

13. The hardware memory device of claim 12, wherein the component comprises a hot-pluggable or hot-swappable device.

14. The hardware memory device of claim 12, wherein the program instructions, upon execution by the RAC, further cause the RAC to transmit a copy of the delta inventory certificate to the remote validation service.

15. A method, comprising:
in response to a component being added to an Information Handling System (IHS), receiving a request for a delta inventory certificate from a Remote Access Controller (RAC) coupled to the IHS; and
transmitting a copy of the delta inventory certificate to the RAC;
wherein to determine that the component has been added to the IHS the RAC receives an indication from a Basic Input/Output System (BIOS) or an Operating System (OS) of the IHS that the component has been coupled to the IHS.

16. The method of claim 15, further comprising maintaining a ledger associating each of a plurality of IHSs with a corresponding set of delta inventory certificates.

17. The method of claim 16, further comprising storing an indication of the delta certificate associated with an identity of the IHS in the ledger.

18. The method of claim 16, further comprising generating the delta inventory certificate, at least in part, in response to a determination, using the ledger, that the component is not coupled to another one of the plurality of IHS.

* * * * *